US005682556A

United States Patent [19]
Iwane et al.

[11] Patent Number: 5,682,556
[45] Date of Patent: Oct. 28, 1997

[54] CAMERA WITH VIBRATION CORRECTING FUNCTION

[75] Inventors: Yukikazu Iwane, Kawasaki; Sueyuki Ohishi, Tokyo; Tatsuo Amanuma, Ageo; Toshiyuki Nakamura, Tokyo, all of Japan

[73] Assignee: Nikon Corporation, Tokyo, Japan

[21] Appl. No.: 734,314

[22] Filed: Oct. 21, 1996

Related U.S. Application Data

[63] Continuation of Ser. No. 377,797, Jan. 24, 1995, abandoned.

[30] Foreign Application Priority Data

| Apr. 28, 1994 | [JP] | Japan | 6-092654 |
| Apr. 28, 1994 | [JP] | Japan | 6-092655 |
| Apr. 28, 1994 | [JP] | Japan | 6-092656 |
| Apr. 28, 1994 | [JP] | Japan | 6-092657 |

[51] Int. Cl.[6] .............................. G03B 5/00; G03B 15/05
[52] U.S. Cl. .................... 396/55; 396/206; 396/303
[58] Field of Search ...................... 396/55, 52, 53, 396/54, 206, 301, 303; 348/208, 370, 371, 372

[56] References Cited

U.S. PATENT DOCUMENTS

| 4,965,619 | 10/1990 | Shikaumi et al. | 354/430 X |
| 5,585,875 | 12/1996 | Imafuji et al. | 396/55 |
| 5,596,366 | 1/1997 | Takashima et al. | 348/208 |

Primary Examiner—W. B. Perkey

[57] ABSTRACT

In a camera with vibration correcting function, by varying the optical axis of the phototaking lens according to the vibration of the camera, there are provided a main control device for controlling the phototaking exposure process of the camera and a vibration correcting control device for controlling the vibration correcting operation of the camera, in which the vibration correcting control device has at least a stopped state without function and a function state, and the main control device is electrically connected with the vibration correcting control device and is adapted to control the same. The power consumption in the vibration correcting control device is reduced by switching the stopped state and the function state of the vibration correcting control device, by the control signal from the main control device.

44 Claims, 17 Drawing Sheets

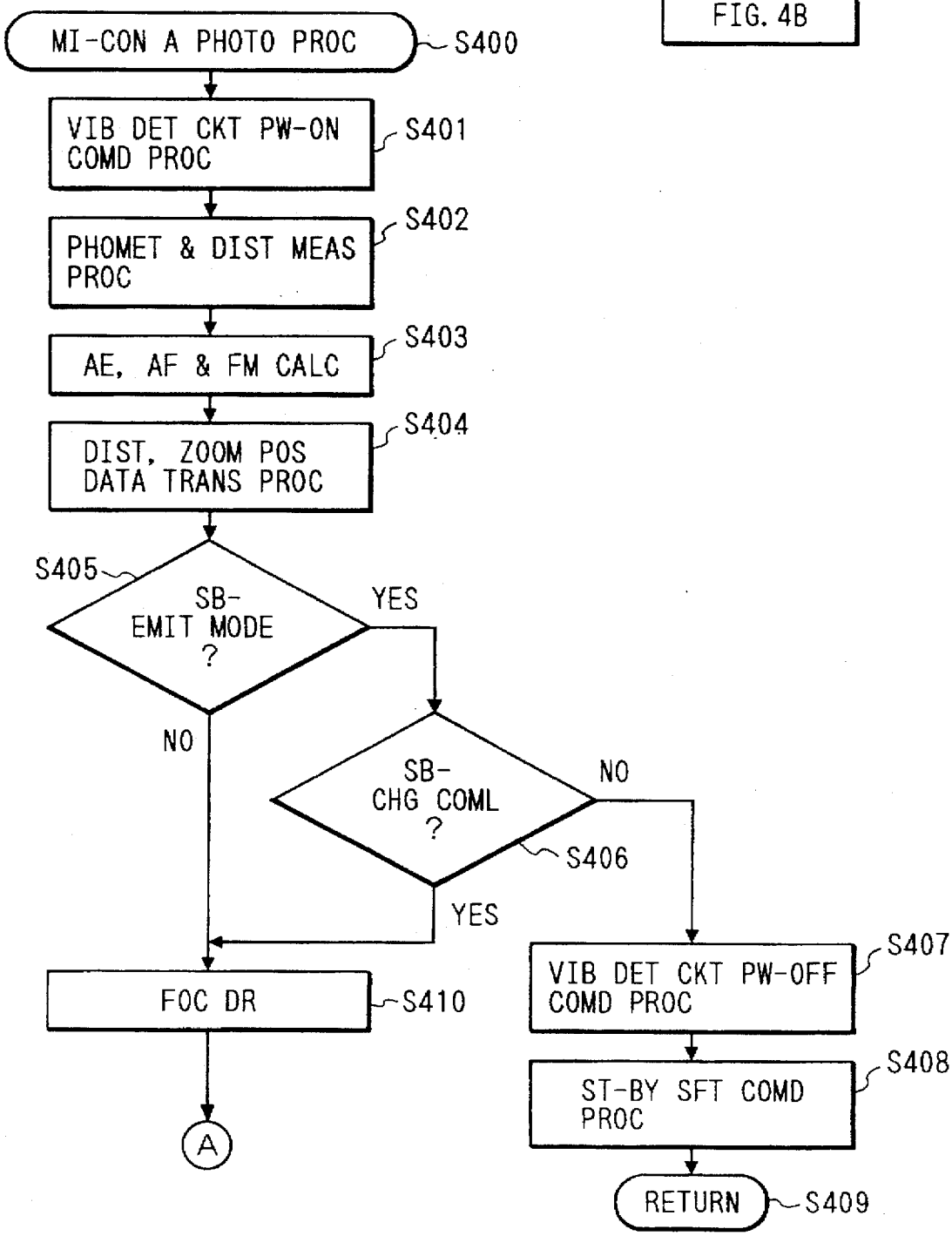

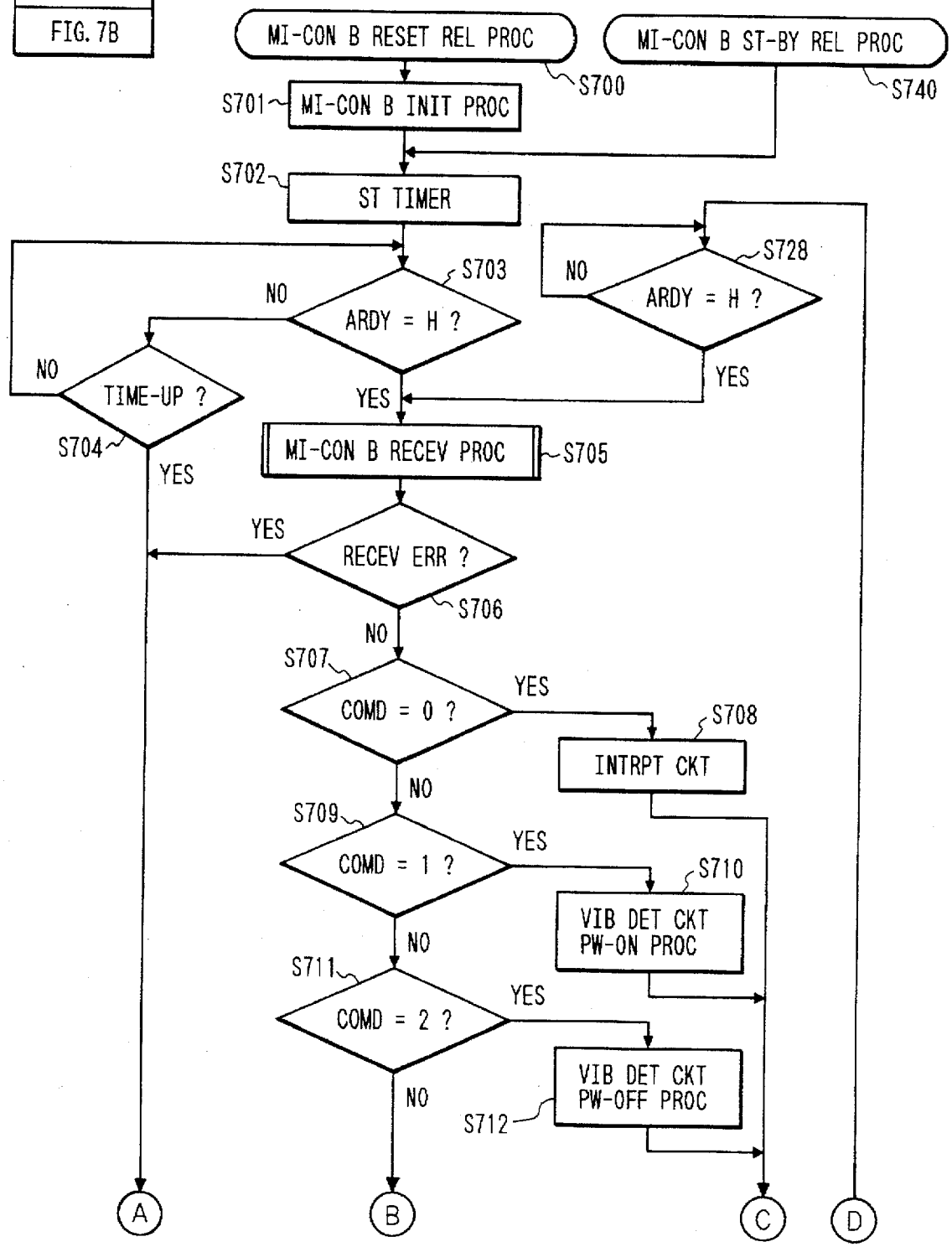

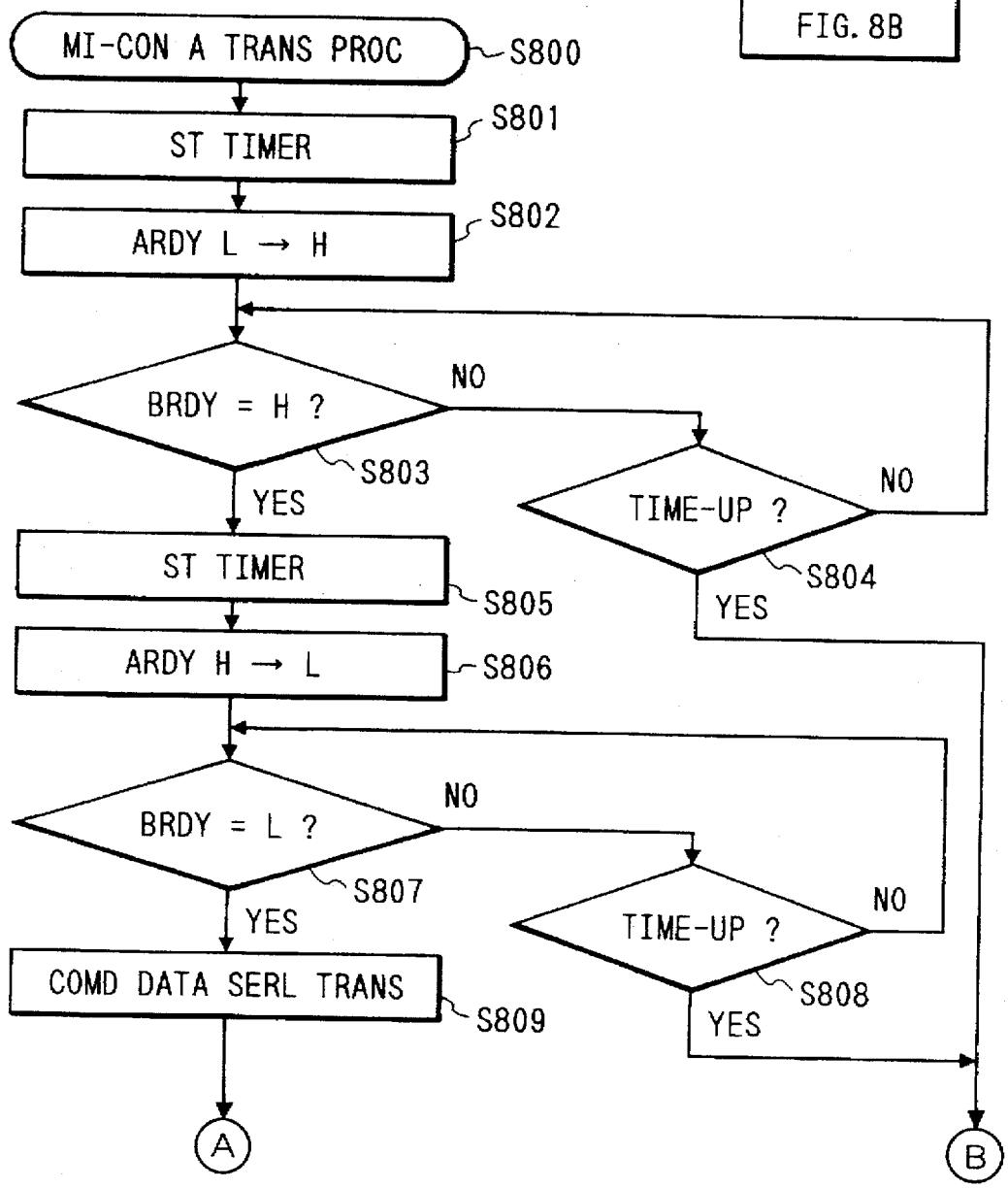

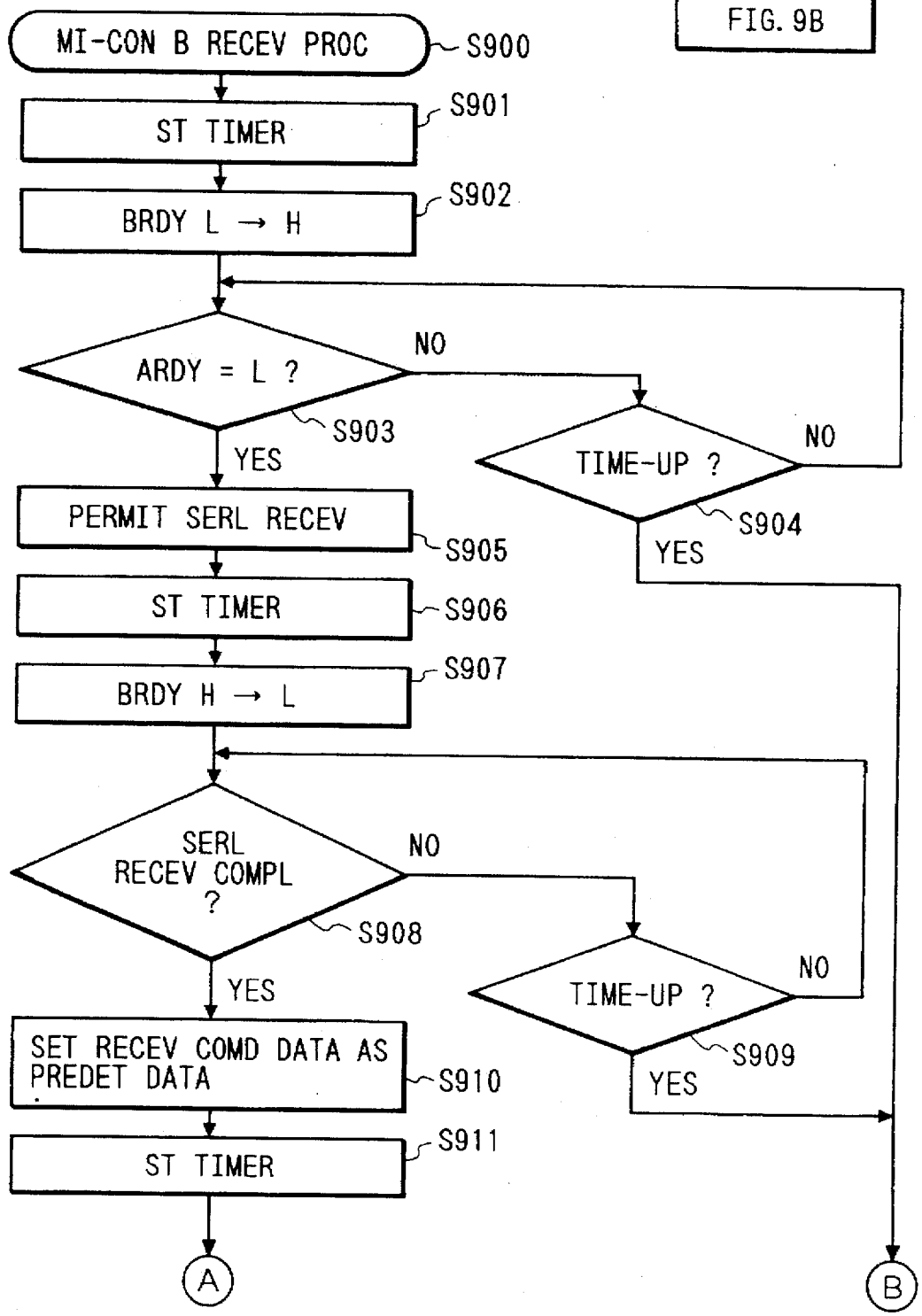

CAMERA WITH VIBRATION CORRECTING FUNCTION

This application is a continuation of application Ser. No. 08/377,797, filed Jan. 24, 1995, now abandoned.

BACKGROUND OF THE INVENTION

1. Field of the Invention

The present invention relates to a camera with vibration correcting function.

2. Related Background Art

Conventionally there has been proposed a camera with vibration correcting function, in which the vibration of the camera is detected by a vibration detecting circuit, utilizing for example an angular velocity sensor, and the vibration is corrected by a variation in the optical axis of the phototaking optical system based on the detected vibration.

The variation of the optical axis of the phototaking optical system is achieved by shifting a vibration correcting lens, constituting a part of the phototaking optical system, in a direction perpendicular to the optical axis, by means for example of a motor. In case a motor is employed, the rotation thereof is reduced for example with gears and converted to a linear movement for driving the vibration correcting lens.

Also in the conventional camera with vibration correcting function, the driving speed for the vibration correcting lens for correcting the vibration is calculated from the output of the vibration detecting circuit, and the drive amount for the vibration correcting lens is calculated, based on the output of a lens position detecting circuit. The vibration correcting lens is so driven, from a predetermined reference position (hereinafter called reset position), such that the optical axis comes to the approximate center of the phototaking optical system (such drive hereinafter called centering drive). Immediately prior to the exposure process for exposing the film to the light by releasing the shutter, a microcomputer starts control (hereinafter called vibration correcting control) on a motor driving circuit based on the calculated driving speed and driving amount, thereby driving the vibration correcting lens to vary the optical axis thereby canceling the vibration of the camera. After the completion of the exposure process and the termination of the vibration correcting control, the vibration correcting lens is driven to the reset position (hereinafter called resetting drive).

There are provided a main microcomputer for controlling the phototaking process of the camera, and a sub microcomputer for controlling the vibration detecting circuit, the lens position detecting circuit and the motor driving circuit and executing the vibration correcting control. The main microcomputer and the sub microcomputer are electrically connected, and the main microcomputer controls the sub microcomputer by serial communication.

The sub microcomputer has a function state of executing a process according to a program incorporated therein, a stand-by state in which the program execution is suspended and the power consumption is significantly lower than that in the function state, and a stopped state (hereinafter called reset state) in which program execution is stopped and the internal data are initialized.

In the conventional art, as explained above, the main microcomputer controls the sub microcomputer through certain devices such as a resetting IC in order to release the sub microcomputer from the reset state or to shift it to the reset state. For this reason there is required a large circuit area with an increased cost.

Also the main microcomputer and the sub microcomputer effect mutual data transfer by serial communication, and, in case of an error in the serial communication, the vibration detecting circuit, the lens position detecting circuit and the motor driving circuit may remain in the functional state, thus resulting in the consumption of the battery or in generation or expansion of the trouble.

SUMMARY OF THE INVENTION

In consideration of the foregoing, an object of the present invention is to resolve the increased cost resulting from the increased circuit area in the configuration in which the main microcomputer controls the sub microcomputer through the resetting IC.

Another object of the present invention is to resolve the consumption of the battery or the generation or expansion of troubles, in case of an error in the serial communication.

The camera of the present invention is provided with a main control device for controlling the phototaking exposure operation of the camera, a vibration detecting device for detecting the vibration of the camera, an optical axis varying device for varying the optical axis of the phototaking lens, a driving device for driving the optical axis varying device, and a vibration correcting control device for controlling the driving device according to the output of the vibration detecting device to drive the optical axis varying device thereby executing correction of vibration, wherein the vibration correcting control device has at least a stopped state and a function state, and the main control device is electrically connected with the vibration correcting control device and is adapted to control said vibration correcting control device and to switch the stopped state and the function state thereof by means of control signals.

In the camera of the present invention, when the power supply is turned on in the camera, the main control device is adapted to cancel the stopped state of the vibration correcting control device by a control signal thereto.

Also the camera of the present invention is provided with a main control device for controlling the phototaking exposure operation of the camera, a vibration detecting device for detecting the vibration of the camera, an optical axis varying device for varying the optical axis of the phototaking lens, a driving device for driving said optical axis varying device, and a vibration correcting control device for controlling the driving device according to the output of the vibration detecting device to drive the optical axis varying device thereby executing correction of vibration, wherein said vibration correcting control device has at least a stopped state and a function state, and said main control device is electrically connected to the vibration correcting control device and is adapted to control the vibration correcting control device, by shifting the same from the stopped state to the function state by a control signal from the main control device and thereafter controlling the vibration correcting control device by serial data communication between the main control device and the vibration correcting control device, wherein the vibration correcting control device is adapted to cut off the power supply to the vibration detecting device and the driving device in case the vibration correcting control device detects the absence of serial data communication from the main control device for a predetermined period after the cancellation of the stopped state.

Also the camera of the present invention is provided with a main control device for controlling the phototaking exposure operation of the camera, a vibration detecting device for detecting the vibration of the camera, an optical axis varying device for varying the optical axis of the phototaking lens, a driving device for driving the optical axis varying device, and a vibration correcting control device for controlling the driving device according to the output of the vibration detecting device to drive the optical axis varying device thereby executing the correction of vibration, wherein said vibration correcting control device has at least a stopped state, a stand-by state waiting for a function, and a function state, and the main control device is electrically connected to the vibration correcting control device and is adapted to control the vibration correcting control device by shifting the same from the stopped state to the function state by a control signal from the main control device and thereafter effecting serial data communication with the vibration correcting control device, wherein said vibration correcting control device is adapted to shift to the stand-by state in case said device detects the absence of the serial data communication from the main control device for a predetermined period after the cancellation of the stopped state.

The present invention provides the following effects.

The camera of the present invention dispenses with a resetting IC to be attached to the vibration correcting control device, since the stopped state and the function state thereof are switched by the control signals from the main control device.

The camera of the present invention dispenses with the resetting IC and enables a camera to activate the vibration correcting device in synchronization with the main control device at the start of power supply to the camera, since the stopped state of the vibration correcting control device is canceled by the control signal thereto from the main control device at said start of power supply.

The camera of the present invention reduces the power consumption in the vibration detecting device and the driving device and avoids generation and expansion of troubles in case of an erroneous function of the vibration correcting control device. This is accomplished by responding to a noise in the control signal, since the vibration correcting control device is adapted to cut off the power supply to the vibration detecting device and the driving device in case said vibration detecting control device detects absence of the serial data communication from the main control device for a predetermined period after the cancellation of the stopped state.

The camera of the present invention reduces the power consumption in the vibration correcting control device in case of an erroneous function thereof by responding to a noise in the control signal, since the vibration correcting control device is adapted to shift to the stand-by state in case said device detects the absence of serial data communication from the main control device for a predetermined period after the cancellation of the stopped state.

Also the camera of the present invention is provided with a main control device for controlling the phototaking exposure operation of the camera, a vibration detecting device for detecting vibration of the camera, an optical axis varying device for varying the optical axis of the phototaking lens, a driving device for driving the optical axis varying device, and a vibration correcting control device for controlling the driving device according to the output of the vibration detecting device to drive the optical axis varying device thereby executing correction of vibration, wherein the vibration correcting control device has at least a stand-by state waiting for a function and a function state, and the main control device is electrically connected with the vibration correcting control device and is adapted to control said vibration correcting control device and to switch the stand-by state and the function state thereof by serial data transfer therewith.

Also in the camera of the present invention, the vibration correcting control device is released from the stand-by state and is shifted to the function state by a signal of at least one of the signal lines electrically connected for serial data transfer.

Also in the camera of the present invention, the vibration correcting control device is released from the stand-by state and shifted to the function state by serial data transfer between the main control device and the vibration correcting control device, in response to the operation of a half-stroke switch operating member of a shutter release button executing the phototaking process of the camera.

Also in the camera of the present invention, the main control device is adapted to cancel the stand-by state of the vibration correcting control device and to shift the same to the function state, by serial data transfer with said vibration correcting control device in response to the operation of a main switch operating member enabling the phototaking process of the camera.

Also in the camera of the present invention, the main control device is adapted to shift the vibration correcting control device from the function state to the stand-by state, by effecting serial data transfer with the vibration correcting control device, in response to the completion of the exposure process of the camera.

Also in the camera of the present invention, the main control device is adapted to shift the vibration correcting control device from the function state to the stand-by state by effecting serial data transfer with the vibration correcting control device, in response to the cancellation of operation of a half-stroke switch operating member of a shutter release button for executing the phototaking process of the camera.

Also in the camera of the present invention, there is provided an electronic flash device, and, in case of an exposure process involving flash emission by the electronic flash device, the main control device is adapted to shift the vibration correcting control device from the function state to the stand-by state by serial data transfer thereto in case the electronic flash device is identified as uncharged.

Also in the camera of the present invention, in case a self-timer phototaking operation is canceled in the course of time measurement by a self-timer of the camera, the main control device is adapted to shift the vibration correcting control device from the function state to the stand-by state by serial data transfer with the vibration correcting control device.

Also in the camera of the present invention, the main control device is adapted to shift the vibration correcting control device from the function state to the stand-by state by serial data transfer therewith, after the vibration correcting control device drives the optical axis varying device to a predetermined reference position in response to the start of power supply to the camera.

Also in the camera of the present invention, the vibration correcting control device is adapted to shift from the function state to the stand-by state, in case of an absence of serial data transfer from the main control device to the vibration correcting control device for a predetermined time after the release of the vibration correcting control device from the stand-by state.

Also in the camera of the present invention, the vibration correcting control device is adapted to cut off the power supply to the vibration detecting device and the driving device, in case of an absence of serial data transfer from the main control device to the vibration correcting control device for a predetermined time after the release of the vibration correcting control device from the stand-by state.

The present invention provides following effects.

The camera of the present invention, being capable of switching the stand-by state and the function state of the vibration correcting control device by serial data transfer between the main control device and the vibration correcting control device, can reduce the power consumption therein by switching to the stand-by state in case the correction of vibration is not conducted.

The camera of the present invention reduces the power consumption in the vibration correcting control device and can still control the correction of vibration in the vibration correcting control device as in the conventional manner, since the control device releases the vibration correction control device from the stand-by state and shifts the same to the function state by a signal of at least one of the signal lines electrically connected for serial data transfer.

The camera of the present invention can reduce the power consumption in the vibration correcting control device and can shift the vibration correcting control device to a state capable of controlling the correction of vibration in response to the operation of the half-stroke switch, since the main control device releases the vibration correcting control device from the stand-by state and shifts the same to the function state by serial data transfer therewith, in response to the operation of a half-stroke switch operating member of a shutter release button for executing the phototaking process of the camera.

The camera of the present invention can reduce the power consumption in the vibration correcting control device and can shift the vibration correcting control device to a state capable of controlling the correction of vibration in response to the operation of a main switch operating member, since the main control device releases the vibration correcting control device from the stand-by state and shifts the same to the function state by serial data transfer therewith, in response to the operation of the main switch operating member rendering the phototaking operation of the camera possible.

The camera of the present invention can reduce the power consumption in the vibration correcting control device when the control thereof is not required after the exposure process, since the main control device shifts the vibration correcting control device from the function state to the stand-by state by serial data transfer therewith in response to the termination of the exposure process of the camera.

The camera of the present invention can reduce the power consumption in the vibration correcting control device when the control therein is not required, since the main control device shifts the vibration correcting control device from the operation state to the stand-by state by serial data communication therewith, in response to the cancellation of operation of the half-stroke switch operating member.

The camera of the present invention can reduce, in case the camera is provided with an electronic flash device and in case of exposure process involving the flash emission by said electronic flash device, the power consumption in the vibration correcting control device when the control therein is not required, since the main control device shifts the vibration correcting control device from the function state to the stand-by state by serial data transfer therewith if the electronic flash device is identified as uncharged.

The camera of the present invention can reduce the power consumption in the vibration correcting control device when the control therein is not required, since the main control device shifts the vibration correcting control device from the function state to the stand-by state by serial data transfer therewith in case the self-timer phototaking operation is canceled in the cause of time measurement by a self-timer of the camera.

The camera of the present invention can reduce the power consumption in the vibration correcting control device when the control therein is not required, since the main control device shifts the vibration correcting control device from the function state to the stand-by state by serial data transfer therewith after it causes the vibration correcting control means to move the optical axis varying means to a predetermined reference position in response to the start of power supply to the camera.

The camera of the present invention can reduce the power consumption in the vibration correcting control device, since the vibration correcting control device is adapted to shift from the function state to the stand-by state in the absence of serial data transfer from the main control device to the vibration correcting control device for a predetermined time after the vibration correcting control device is released from the stand-by stante, so that the vibration correcting control device, even if shifted from the stand-by state to the function state by a noise in the signal line for serial data transfer, returns to the stand-by state after the lapse of the predetermined time.

The camera of the present invention can reduce the power consumption in the vibration detecting device and the driving device, since the vibration correcting control device is adapted to cut off the power supply to the vibration detecting device and the driving device in the absence of serial data transfer from the main control device to the vibration correcting control device for a predetermined time after the vibration correcting control device is released from the stand-by state, so that the power supply to the vibration detecting device and the driving device is cut off after the lapse of the predetermined time even if said power supply is turned on by the shift of the vibration correcting control device from the stand-by state to the function state by a noise in the signal line for serial data transfer.

Also the camera of the present invention is provided with a main control device for controlling the phototaking exposure operation of the camera, a vibration detecting device for detecting vibration of the camera, an optical axis varying device for varying the optical axis of the phototaking lens, a driving device for driving the optical axis varying device, and a vibration correcting control device for controlling the driving device according to the output of the vibration detecting device to drive the optical axis varying device thereby executing correction of vibration, wherein the vibration correcting control device has at least a stopped state and a function state, and the main control device is electrically connected with the vibration correcting control device and is adapted to control the same by serial data communication therewith, wherein the main control device is adapted to shift the vibration correcting control device from the function state to the stopped state by an output signal from the main control device to the vibration correcting control device, utilizing at least one of electrically connected signal lines, in case the main control device detects abnormality in the serial data communication.

Also the camera of the present invention is provided with a main control device for controlling the phototaking exposure operation of the camera, a vibration detecting device for detecting vibration of the camera, an optical axis varying device for varying the optical axis of the phototaking lens, a driving device for driving the optical axis varying device, and a vibration correcting control device for controlling the driving device according to the output of the vibration detecting device to drive the optical axis varying device thereby achieving correction of vibration, wherein said vibration correcting control device has at least a stopped state and a function state and the main control device is electrically connected with the vibration correcting control device whereby the vibration correction control device effects predetermined control by serial data communication from the main control device and said main control device recognizes the completion of said control by serial data communication from the vibration correcting control device in response to the termination of said control, wherein the main control device is adapted to shift the vibration correcting control device from the function state to the stopped state by a signal of at least one of the electrically connected signal lines, in case of absence of serial data communication from the vibration correcting control device to the main control device for a predetermined time after the serial data communication from the main control device to the vibration correcting control device.

Also in the camera of the present invention, the main control device is adapted to detect abnormality in the serial data communication from the main control device to the vibration detecting control device in case the main control device detects absence of a response signal from the vibration correcting control device within a predetermined time.

Also in the camera of the present invention, the main control device is adapted to detect abnormality in the serial data communication, in case the main control device detects, in the reception of serial data from the vibration detecting control device, the absence of a response signal therefrom within a predetermined time.

Also in the camera of the present invention, the main control device is adapted to detect abnormality in the serial data communication, in case the main control device detects, in the reception of serial data from the vibration correcting control device, that the received data are not normal.

Also in the camera of the present invention, in case the vibration correcting control device is shifted to the stopped state by the abnormality in the serial data communication, the main control device is adapted to release the vibration correcting control device from the stopped state by an output signal thereto from the main control device, utilizing at least one of the electrically connected signal lines.

Also in the camera of the present invention, in case the vibration correcting control device is shifted to the stopped state due to the absence of serial data communication therefrom to the main control device for a predetermined time after the serial data communication from the main control device to the vibration correcting control device, the main control device is adapted to release the vibration correcting control device from the stopped state by an output signal thereto from the main control device, utilizing at least one of the electrically connected signal lines.

Also in the camera of the present invention, the main control device is adapted, after releasing the vibration correcting control device from the stopped state, to cause the same to drive the optical axis varying device to a predetermined reference position, by serial data communication from the main control device to the vibration correcting control device.

The present invention provides following effects.

The camera of the present invention can reduce the power consumption in the devices required for correction of vibration, such as the driving device, and can prevent generation and expansion of troubles, since, in case the main control device detects abnormality in the serial data communication, the main control device shifts the vibration correcting control device from the function state to the stopped state by an output signal thereto from the main control device, utilizing at least one of the electrically connected signal lines whereby the vibration correcting control device is prevented from uncontrolled function or independent control of correction of the vibration by the error in the serial communication.

The camera of the present invention can reduce the power consumption in the devices required for correction of vibration, such as the driving device, and can prevent generation and expansion of troubles, since, in case of an absence of serial data communication from the vibration correcting control device to the main control device within a predetermined time after serial data communication therefrom to the vibration correcting control device, the main control device shifts the vibration correcting control device from the function state to the stopped state by a signal on at least one of the electrically connected signal lines, whereby the vibration correcting control device is prevented from uncontrolled function or independent control of correction of the vibration.

The camera of the present invention enables the main control device to detect the abnormality in the serial data communication in securer a secure manner. Such abnormality is identified, in the serial data transmission from the main control device to the vibration correcting control device, in case the main control device detects an absence of the response signal from the vibration correcting control device within a predetermined time.

The camera of the present invention enables the main control device to detect the abnormality in the serial data communication in a secure manner. Such abnormality is identified, in the reception of serial data from the vibration correcting control device, in case the main control device detects absence of the response signal from the vibration correcting control device within a predetermined time.

The camera of the present invention enables the main control device to detect the abnormality in the serial data communication in a secure manner. Such abnormality is identified, in the reception of serial data from the vibration correcting control device, in case the main control device detects that the received data are not normal.

The camera of the present invention can release, in case the vibration correcting control device is shifted to the stopped state due to the abnormality in the serial data communication, the vibration correcting control device from the stopped state by an output signal thereto from the main control device, utilizing at least one of the electrically connected signal lines, whereby the vibration correcting control device, once shifted to the stopped state, can thereafter be shifted to the function state and rendered capable of control.

The camera of the present invention can release, in case the vibration correcting control device is shifted to the stopped state due to the absence of serial data communication therefrom to the main control device within a predetermined time after the serial data communication therefrom to the vibration correcting control device, the vibration correcting control device from the stopped state by an output signal thereto from the main control device, utilizing at least one of the electrically connected signal lines, whereby the vibration correcting control device, once shifted to the stopped state, can thereafter be shifted to the function state and rendered capable of control.

In the camera of the present invention, the main control device is adapted, after releasing the vibration correcting control device from the stopped state, to cause the same to drive the optical axis varying device to a predetermined reference position by serial data communication from the main control device to the vibration correcting control device, so that the optical axis varying device can be driven to the predetermined reference position even if the optical axis is stopped at an intermediate position by the uncontrolled or independent function of the vibration correcting control device because of the abnormality in the serial data communication or the absence thereof from the vibration correcting control device.

Also the camera of the present invention is provided with a main control device for controlling the phototaking exposure operation of the camera, vibration detecting device for detecting vibration of the camera, an optical axis varying device for varying the optical axis of the phototaking lens, a driving device for driving the optical axis varying device, and a vibration correcting control device for controlling the driving device according to the output of the vibration detecting device to drive the optical axis varying device thereby executing correction of vibration, wherein the main control device is electrically connected to the vibration correcting control device and is adapted to control the same by serial data communication therewith, wherein the vibration correcting control device is adapted to cut of the power supply to the vibration detecting device and the driving device in case said control device detects abnormality in the serial data communication.

Also the camera of the present invention is provided with a main control device for controlling the phototaking exposure operation of the camera, a vibration detecting device for detecting vibration of the camera, an optical axis varying device for varying the optical axis of the phototaking lens, a driving device for driving the optical axis varying device, and a vibration correcting control device for controlling the driving device according to the output from the vibration detecting device to control the optical axis varying device thereby executing correction of vibration, wherein the vibration correcting control device has at least a stand-by state waiting for an operation, and a function state, and the main control device is electrically connected to the vibration correcting control device and is adapted to control the same by serial data communication therewith, wherein the vibration correcting control device is adapted to shift from the function state to the stand-by state in case said control device detects abnormality in the serial data communication.

Also in the camera of the present invention, the vibration correcting control device is adapted to identify abnormality in the serial data communication, in case the vibration correcting control device detects, in the reception of serial data from the main control device, an absence of a response signal therefrom within a predetermined time.

Also in the camera of the present invention, the vibration correcting control device is adapted to identify abnormality in the serial data communication in case the vibration correcting control device detects, in the transmission of serial data to the main control device, an absence of a response signal therefrom within a predetermined time.

Also in the camera of the present invention, the vibration correcting control device is adapted to identify abnormality in the serial data communication, in case the vibration correcting control device detects, in the reception of serial data from the main control device, that the data transfer therefrom is not completed within a predetermined time.

Also in the camera of the present invention, the vibration correcting control device is adapted to identify abnormality in the serial data communication in case the vibration correcting control device detects, in the transmission of serial data to the main control device, that the data transfer to the same is not completed within a predetermined time.

Also in the camera of the present invention, the vibration correcting control device is adapted to identify abnormality in the serial data communication in case the vibration correcting control device detects, in the reception of serial data therefrom, that the data received by the vibration correcting control device are not normal.

The present invention provides following effects.

The camera of the present invention can reduce the power consumption in the vibration detecting device and the driving device even in case of abnormality in the serial data communication, since the vibration correcting control devices cuts off the power supply to the vibration detecting device and the driving device in case the vibration correcting control device detects abnormality in the serial data communication.

The camera of the present invention can reduce the power consumption in the vibration correcting control device even in case of abnormality in the serial data communication, since said control device is adapted to shift from the function state to the stand-by state in case said control device detects abnormality in the serial data communication.

The camera of the present invention enables the vibration detecting control device to detect abnormality in the serial data communication in a secure manner, since the vibration detecting control device identifies abnormality in the serial data communication in case said control device detects, in the reception of serial data from the main control device, an absence of a response signal therefrom within a predetermined time.

The camera of the present invention enables the vibration correcting control device to detect abnormality in the serial data communication in a secure manner, since said control device identifies abnormality in case said control device detects, in the transmission of serial data to the main control device, an absence of a response signal therefrom within a predetermined time.

The camera of the present invention enables the vibration correcting control device to detect abnormality in the serial data communication in securer manner, since said control device identifies abnormality in case said control device detects, in the reception of serial data from the main control device, that the data transfer therefrom is not completed within a predetermined time.

The camera of the present invention enables the vibration correcting control device to detect abnormality in the serial data communication in a secure manner, since said control device identifies abnormality in case said control device detects, in the transmission of serial data to the main control device, that the data transfer thereto is not completed within a predetermined time.

The camera of the present invention enables the vibration correcting control device to detect abnormality in the serial data communication in securer manner, since abnormality is identified in case the vibration correcting control device detects, in the reception of serial data from the vibration correcting control device, that the data received thereby are not normal.

DESCRIPTION OF THE PREFERRED EMBODIMENTS

Figure 1:
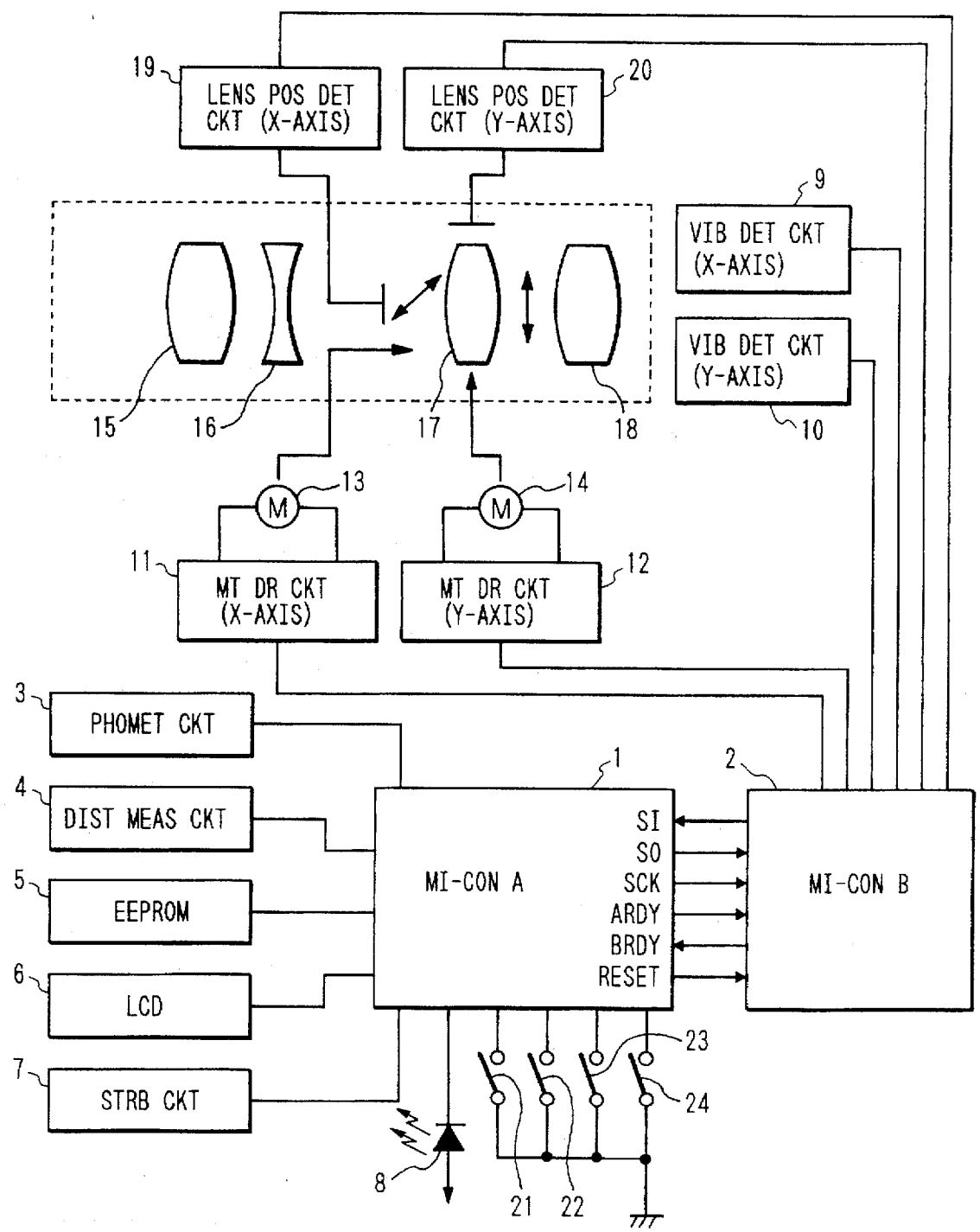
FIG. 1 is a block diagram showing the configuration of a camera with a vibration correcting function according to a preferred embodiment of the present invention.

FIG. 1 is a block diagram showing the configuration of a camera with a vibration correcting function, constituting a first preferred embodiment according to the present invention.

A phototaking lens is composed of four lenses 15, 16, 17 and 18, in which 17 is a vibration correcting lens, which corresponds to the aforementioned optical axis varying device and is drivable in the X-axis (horizontal) direction and in the Y-axis (vertical) direction for correcting vibration, and 18 is a focusing lens drivable in the Z-axis (axial) direction for focusing.

A microcomputer-A 1 is a main microcomputer, corresponding to the aforementioned main control device, executing the phototaking process other than the vibration correcting control and controlling a microcomputer-B 2, and is connected to a photometry circuit 3, a distance measuring circuit 4, a non-volatile memory (EEPROM) 5, a liquid crystal display device (LCD) 6, a strobe flash circuit 7, a vibration state display device 8, a main switch 21, a half-stroke switch 22, a full-stroke switch 23 and a mode switch 24.

The photometry circuit 3 measures the luminance of the object. The distance measuring circuit 4 measures the distance to the object. The EEPROM 5, in advance, stores data required for phototaking process, enabling the microcomputer-A 1 to read data when required by the predetermined process. The LCD 6 displays phototaking information, such as phototaking mode, film frame number, zoom position etc. The strobe flash circuit 7, constituting the electronic flash circuit, is composed of a voltage elevating unit and a light emission control unit and controls the charging and light emission. Also, there can be detected whether the charging is completed. The vibration state display unit 8 indicates the vibration state of the camera. The main switch 21, for initiating the function of the camera, has an on-position and an off-position, and retains the on-position, once set by the photographer, until it is returned to the off-position by the photographer. The half-stroke switch 22 is closed by a half-stroke depression of the shutter release button. The full-stroke switch 23 is closed by a full-stroke depression thereof. The mode switch 24 can cyclically select the phototaking modes, such as the strobe phototaking mode and the self-timer phototaking mode, upon every actuation by the photographer.

A microcomputer-B 2 is a sub microcomputer corresponding to the aforementioned vibration correcting control device and is connected to vibration detecting circuits 9, 10, motor driving circuits 11, 12 snf lens position detecting circuits 19, 20, for executing the vibration correcting control. The vibration detecting circuits 9, 10, corresponding to the aforementioned vibration detecting device, respectively detect angular velocities in the X- and Y-directions, generated by the camera vibration. The motor driving circuits 11, 12, corresponding to the aforementioned driving device, are respectively provided with motors 13, 14 for driving the vibration correcting lens 17 in the X- and Y-directions. The rotations of said motors 13, 14 are converted into linear movements by vibration correcting lens drive mechanisms (not shown) to drive the vibration correcting lens 17 respectively in the X- and Y-directions. The lens position detecting circuits 19, 20, corresponding to the lens position detecting device, respectively read the position of the vibration correcting lens 17 in the X- and Y-directions. The outputs of the vibration detecting circuits 9, 10 are A/D converted in the microcomputer-B 2 to determine the angular velocity of the camera resulting from the vibration, whereby calculated is a target velocity at which the vibration correcting lens 17 is to be controlled for correcting the vibration. Also the actual moving velocity of the vibration correcting lens 17 is calculated from the outputs of the lens position detecting circuits 19, 20. The microcomputer-B 2 calculates the drive amounts of the motors 13, 14 from the target velocity of the vibration correcting lens 17 and the actual moving velocity thereof, and drives the motors 13, 15 through the motor driving circuits 11, 12, whereby the vibration correcting lens 17 is driven with an appropriate speed and the vibration is corrected.

The microcomputer-A 1 is connected with the microcomputer-B 2 by the lines of following control signals and controls the latter by serial communication therebetween, thereby executing the vibration correcting control;

ARDY: an output signal from the microcomputer-A 1 to the microcomputer-B 2, for requesting data transfer from A to B or for hand-shake of A and B;

BRDY: an output signal from the microcomputer-B 2 to the microcomputer-A 1, for requesting data transfer from B to A or for hand-shake of A and B;

SCK: an output signal from the microcomputer-A 1 to the microcomputer-B 2, used as the serial clock signal for serial data transfer between A and B;

SO: an output signal from the microcomputer-A 1 to the microcomputer-B 2, used for data transfer from A to B in synchronization with the SCK signal;

SI: an output signal from the microcomputer-B 2 to the microcomputer-A 1, used for data transfer from B to A in synchronization with the SCK signal; and RESET: an output signal from the microcomputer-A 1 to the microcomputer-B 2, for releasing the microcomputer-B 2 from the reset state or shifting the same to the reset state.

The microcomputer-B 2 is shifted to the reset state by the L-level state of the RESET signal, and is shifted from the reset state to the function state in response to the shifting of the RESET signal from the L-level to H-level. Said microcomputer-B 2 is provided with a wake-up function of for being shifted from the stand-by state to the function state in response to the shift of the ARDY signal from the L-level to H-level. The function state means a state of execution of a process according to a program incorporated in the microcomputer, and the stand-by state means a waiting state in which the program execution is temporarily interrupted, and in which the power consumption is much less than that in the function state. The internal data of the microcomputer and the states of the input/output ports thereof remain same as those immediately before the shift to the stand-by state. The reset state means a stopped state in which the program execution is stopped and the internal data are initialized.

The microcomputers-A, B are composed of one-chip microcomputers and control the entire control sequences of the camera. The microcomputer-A 1 has timer function, AE (auto exposure) calculating function, AF (auto focusing) calculating function etc., while the microcomputer-B 2 has timer function, A/D converting function, vibration correcting function etc.

Sequences shown in the following flow charts are those relating to the present preferred embodiment, among the programs incorporated in the microcomputers A and B.

Figure 2:
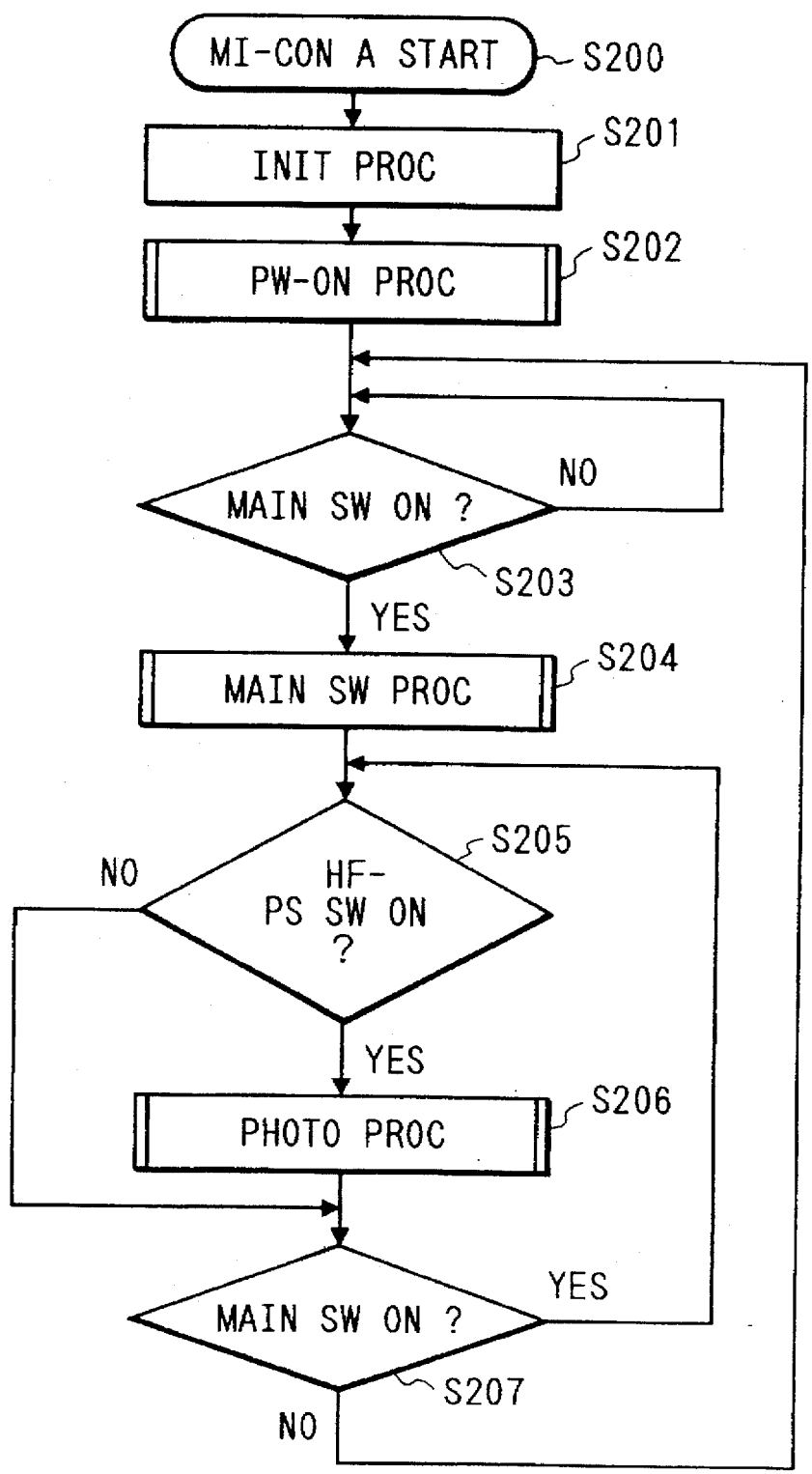
FIG. 2 is a flow chart showing the entire control sequence of a microcomputer-A of the camera with a vibration correcting function of according to the present invention.

FIG. 2 is a flow chart showing the entire control sequence of the microcomputer-A 1 in the camera with a vibration correcting function, constituting the first embodiment preferred of the present invention.

In response to the start of power supply, the microcomputer-A 1 starts the sequence from a step S200. At first a step S201 initializes the internal data and the input/output ports of the microcomputer-A 1, then a step S202 executes a power supply start process to be explained later, and a step S203 discriminates whether the main switch 21 is turned on. If turned on, a step S204 executes a main switch process to be explained later and the sequence proceeds to a step S205, but, if off, the discrimination is continued until the main switch 21 is turned on. The step S205 discriminates whether the half-stroke switch 22 is turned on, and, if on, a step S206 executes a phototaking process to be explained later and the sequence proceeds to a step S207, but, if off, the sequence proceeds directly to the step S207. The step S207 discriminates whether the main switch 21 is turned on, and, if on, the sequence returns to the step S205 to repeat the discrimination of the half-stroke switch 22, but, if off, the sequence returns to the step S203.

In this manner the states of the main switch 21 and the half-stroke switch 22 are discriminated, and the phototaking process is executed if the half-stroke switch 22 is turned on while the main switch 21 is on.

Figure 3:
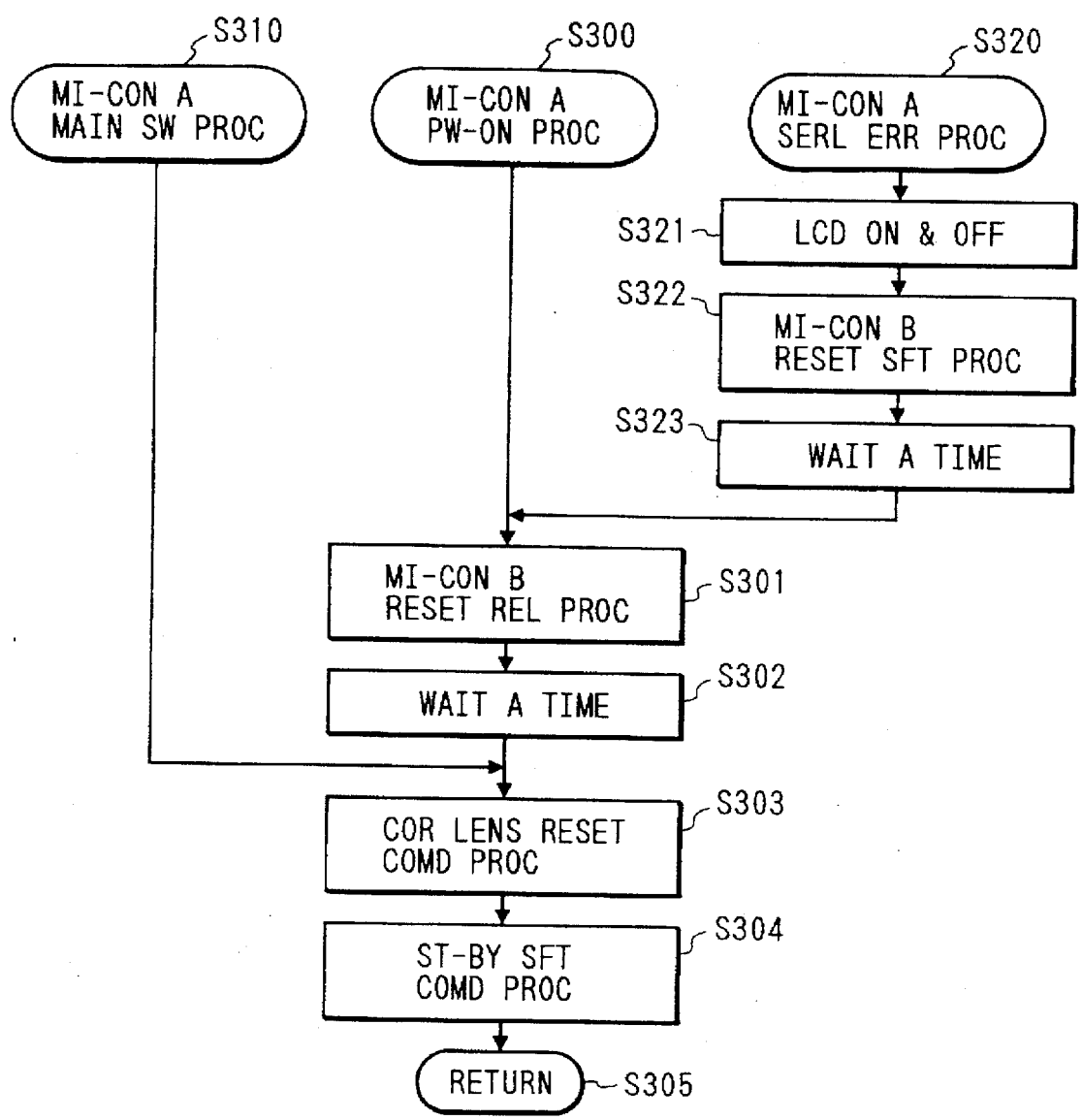
FIG. 3 is a flow chart showing the sequence in the start of power supply of the microcomputer-A, in the closing of a main switch and in an error in the serial communication between the microcomputers A and B in the camera with a vibration correcting function according to the present invention.

FIG. 3 is a flow chart showing the process at the start of power supply, at the turning-on of the main switch 21 and at the error in the serial communication between the microcomputers A and B, to be executed by the microcomputer-A 1 in the camera with a vibration correcting function, constituting the first preferred embodiment according to the present invention.

When the power supply to the microcomputer-A 1 is started, the power supply start process shown in the step S202 in FIG. 2 is started from a step S300 in FIG. 3. A step S301 releases the microcomputer-B 2 from the reset state, and a step S302 waits for a predetermined time.

In a next step S303, the microcomputer-A 1 sends a vibration correcting lens reset command, for driving the vibration correcting lens 17 to the reset position, to the microcomputer-B 2 by serial communication. Then, in a step S304, the microcomputer-A 1 sends a stand-by shift command, for shifting the microcomputer-B 2 from the function state to the stand-by state, to the microcomputer-B 2 by serial communication. A step S305 terminates the microcomputer-A power supply start process and the sequence proceeds to the step S203 in FIG. 2. Thus, when the power supply is turned on, the microcomputer-A 1 releases the microcomputer-B 2 from the reset state, and, after the predetermined process, the microcomputer-A 1 shifts the microcomputer-B 2 from the function state to the stand-by state by the serial communication.

Figure 14:
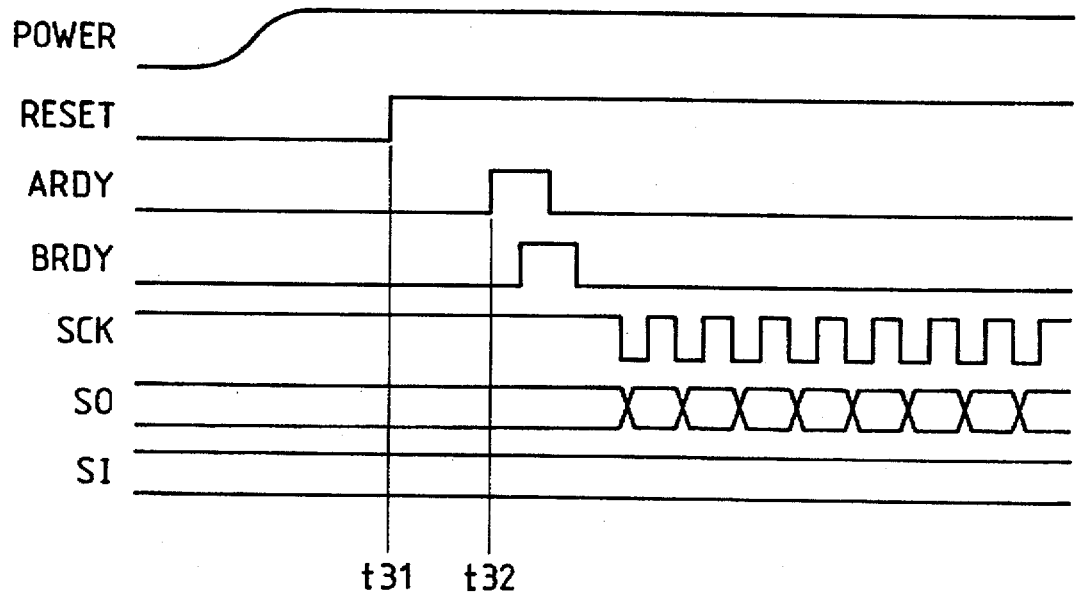
FIG. 14 is a timing chart showing the mode of process according to the microcomputer-A of the present invention at the start of power supply.

With reference to FIG. 14, the microcomputer-B 2 is in the reset state from the start of power supply to a time t31, at which the microcomputer-A 1 shifts the RESET signal from the L-level to the H-level, whereby the microcomputer-B 2 is released from the reset state. The period after a time t32 corresponds to the serial communication of the step S303.

When the main switch 21 is turned on, the microcomputer-A main switch process in the step S204 in FIG. 2 is started from a step S310 in FIG. 3. A process same as explained before is executed from a step S303, then a step S305 terminates the microcomputer-A main switch process, and the sequence proceeds to the step S205 in FIG. 2. Thus, when the main switch 21 is turned on, the microcomputer-A 1 shifts the microcomputer-B 2 from the stand-by state to the function state by serial communication, and, after the predetermined process, the microcomputer-A 1 shifts the microcomputer-B 2 from the function state to the stand-by state by serial communication.

Figure 12:
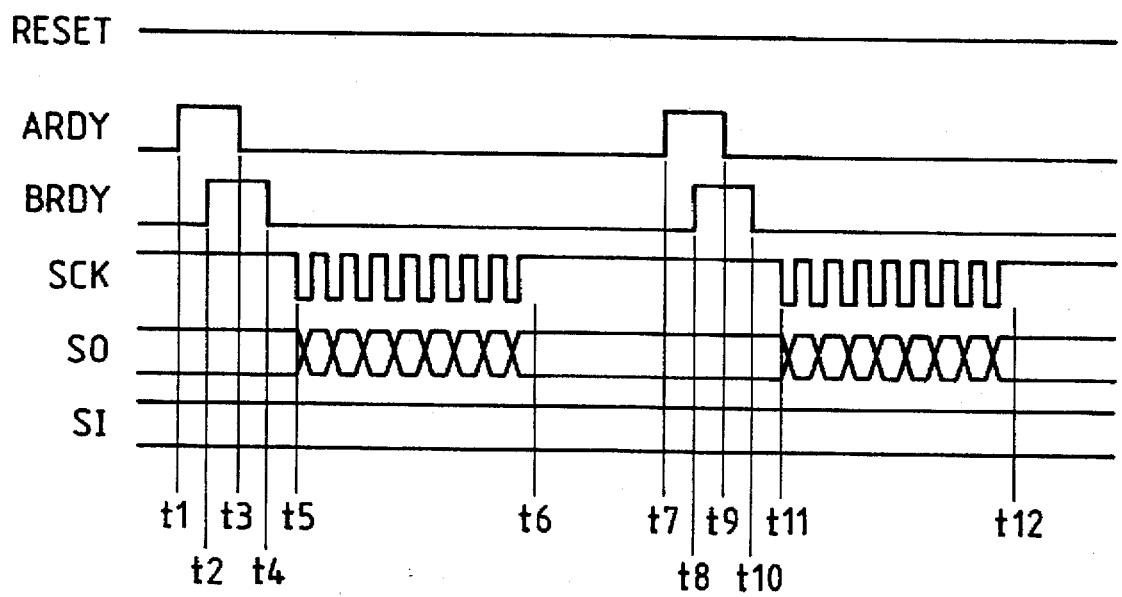
FIG. 12 is a timing chart showing an example of communication from the microcomputer-A to the microcomputer-B according to the present invention.

Referring to FIG. 12, the microcomputer-B 2 remains in the stand-by state up to a time t1, at which the microcomputer-A 1 shifts the ARDY signal from the L-level to the H-level by serial communication, whereby the microcomputer-B 2 is released from the stand-by state and enters the function state by the wake-up function. Details of the serial communication of the microcomputers A and B will be explained later.

In case a communication error is generated in the serial communication of the microcomputers A and B and is detected by the microcomputer-A 1, a microcomputer-A serial error process is started from a step S320. A step S321 intermittently turns on the LCD6; a step S322 executes a reset shift process in which the microcomputer-A 1 forcedly shifts the microcomputer-B 2 to the reset state; a step S323 waits for a predetermined time, and the sequence then proceeds to the step S301, from which the process same as explained before is executed. The step S305 terminates the microcomputer-A serial error process, whereupon the sequence proceeds to the step S203 in FIG. 2. The on-and-off state of the LCD 6 continues until the main switch 21 or the half-stroke switch 22 is turned on again.

In summary, in case of an error in the serial communication, the LCD 6 is intermittently turned on, and the microcomputer-A 1 forcedly shifts the microcomputer-B 2 to the reset state. After a predetermined time, the microcomputer-A 1 releases the microcomputer-B 2 from the reset state. After the execution of a predetermined process, the microcomputer-A 1 shifts the microcomputer-B 2 from the function state to the stand-by state by serial communication.

Figure 4B:
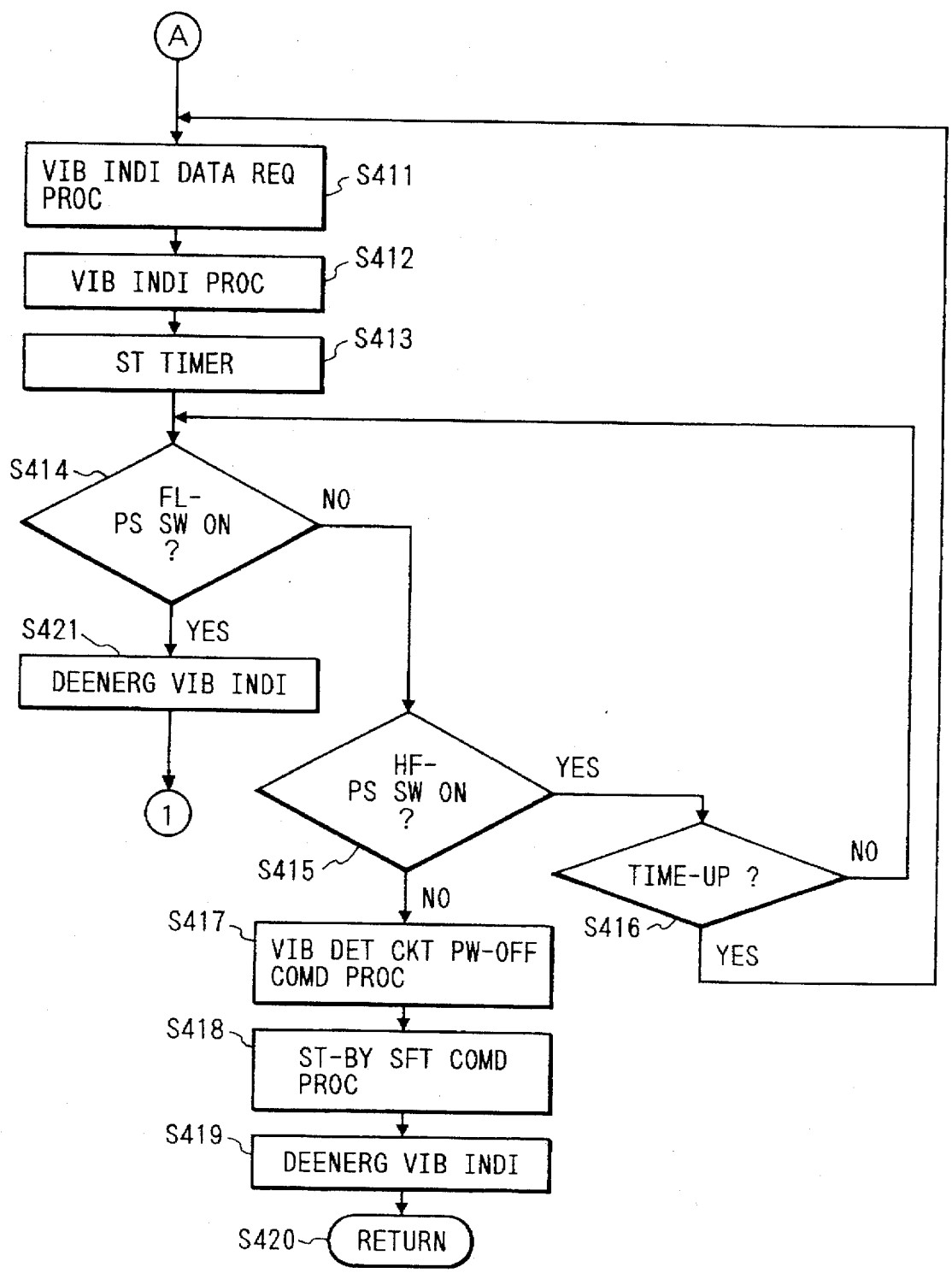
FIG. 4 is comprised of FIGS. 4A and 4B, each showing a flow chart of the phototaking process of the microcomputer-A in the camera with a vibration correcting function according to the present invention.
Figure 5:
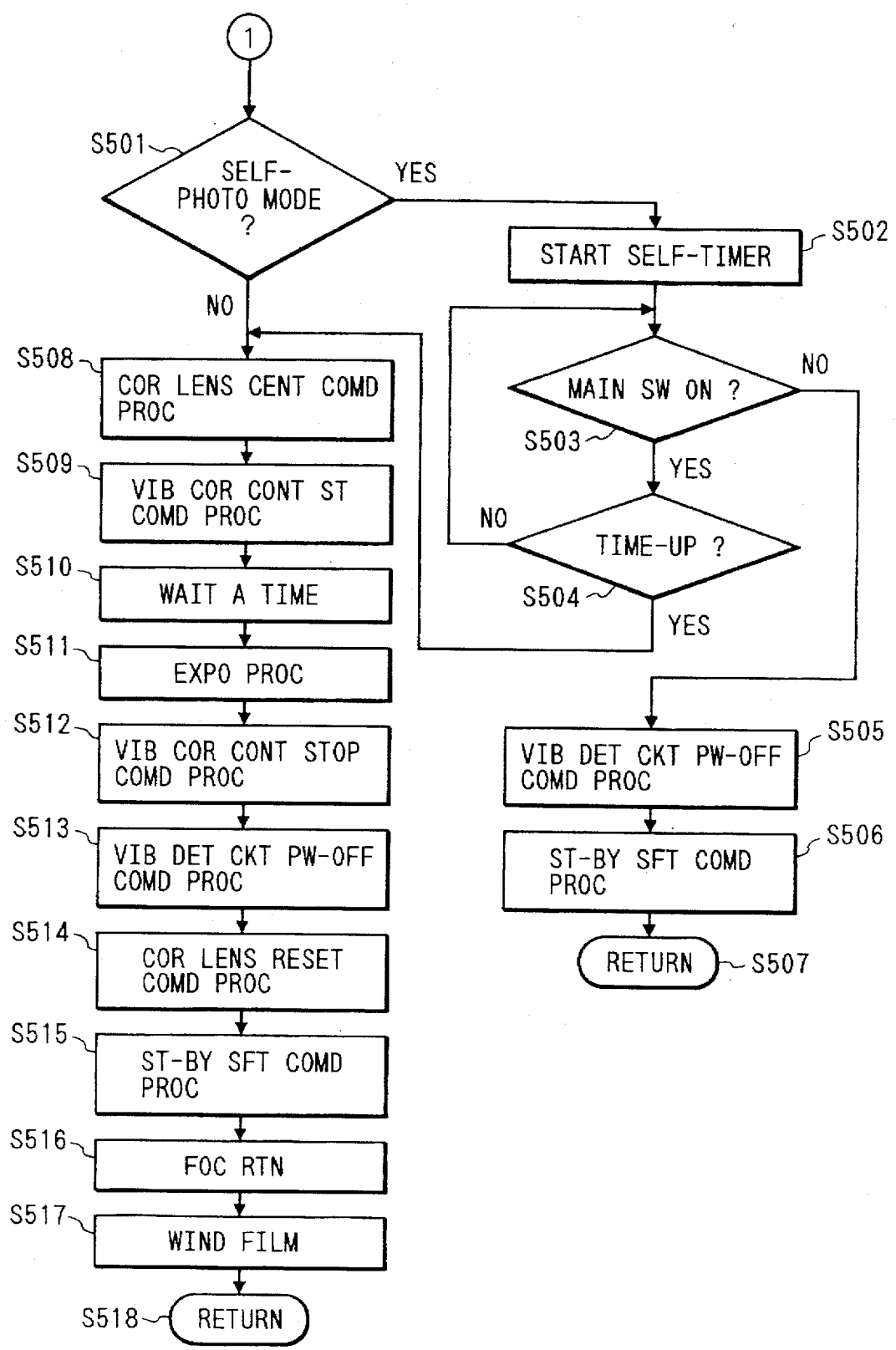
FIG. 5 is a flow chart showing a process of the microcomputer-A after the phototaking process, in the camera with a vibration correcting function according to the present invention.
Figure 15:
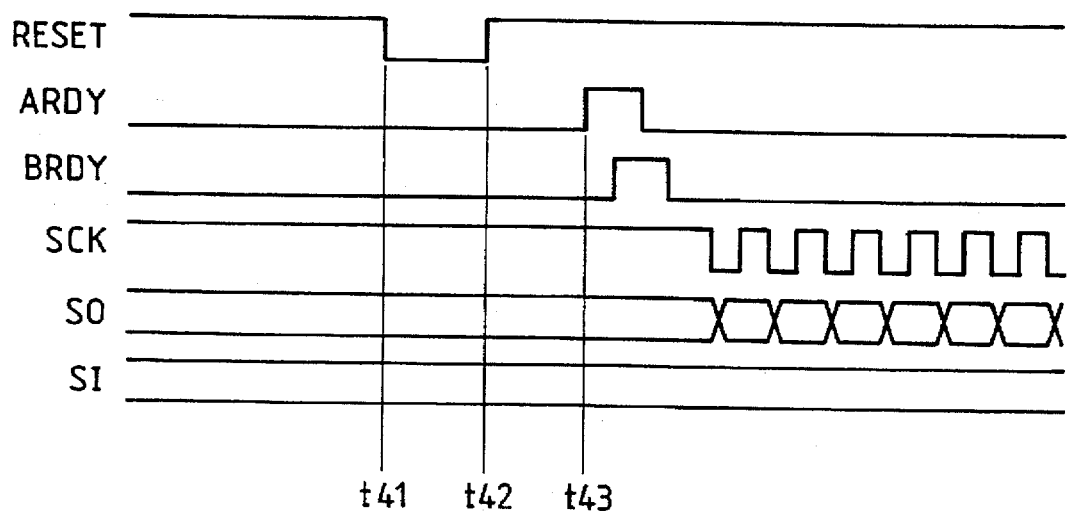
FIG. 15 is a timing chart showing the mode of process according to the microcomputer-A of the present invention at detection of an error in the serial communication.

Referring to FIG. 15, the microcomputer-B 2 is in the function or stand-by state up to a time t41, at which the microcomputer-A 1 shifts the RESET signal from the H-level to the L-level (corresponding to the process in S322), whereupon the microcomputer-B 2 is shifted to the reset state. After a predetermined time, the microcomputer-A 1 shifts the RESET signal from the L-level to the H-level (corresponding to the process in S301) at a time t42, whereby the microcomputer-B 2 is released from the reset state. A period after a time t43 corresponds to the serial communication of the step S303. FIGS. 4A, 4B and 5 are flow charts showing the phototaking process of the microcomputer-A 1 in the camera with vibration correcting function of the present invention. In case the half-stroke switch 22 is turned on while the main switch 21 is on, a microcomputer-A phototaking process shown in the step S206 in FIG. 2 is started from a step S400 in FIG. 4A. In a step S401, the microcomputer-A 1 sends a vibration detecting circuit power-on command, for turning on the power supply to the vibration detecting circuits 9, 10 and starting the detection of angular velocity resulting from vibration, to the microcomputer-B 2 by serial communication, and the sequence then proceeds to a step S402. In said serial communication, the microcomputer-A 1 shifts the ARDY signal from the L-level to the H-level whereby the microcomputer-B 2 is released from the stand-by state and enters the function state. The step S402 activates the photometry circuit 3 to effect photometry, and activates the distance measuring circuit 4 to effect distance measurement, and a step S403 executes AE calculation, AF calculation and FM calculation, based on the results of photometry and distance measurement in the step S402. In a next step S404, the microcomputer-A 1 executes a distance/zoom position data transfer process, for transferring the data on distance and zoom position required for correction of vibration to the microcomputer-B 2 by serial communication. Then a step S405 discriminates whether a strobe emission phototaking mode is selected by the result of AE calculation in the step S403 or by the mode switch 24. If the strobe emission mode is selected, a next step S406 discriminates whether the charging of the strobe circuit 7 has been completed. If the step S405 identifies the strobe emission mode and the step S406 identifies the uncharged state of the strobe circuit 7, said circuit is activated to start the charging, and, in a next step S407, the microcomputer-A 1 sends a vibration detecting circuit power-off command, for turning off the power supply to the vibration detecting circuits 9, 10 and terminating the detection of angular velocity caused by vibration, to the microcomputer-B 2 by serial communication. In a next step S408, the microcomputer-A 1 sends a stand-by shift command, for shifting the microcomputer-B 2 from the function state to the stand-by state, to the microcomputer-B 2 by serial communication, and, in a next step S409, the sequence proceeds to the step S207 in FIG. 2. If the step S405 identifies that the strobe emission mode is not selected, or if the step S406 identifies the completion of charging of the strobe circuit 7, the sequence proceeds to a step S410. In summary, when the half-stroke switch 22 is turned on, the microcomputer-A 1 shifts the microcomputer-B 2 from the stand-by state to the function state by serial communication, thereby causing the microcomputer-B 2 to turn on the power supply to the vibration detecting circuits 9, 10. After the half-stroke switch 22 is turned on, if there are identified the strobe emission phototaking mode and the uncompleted charging of the strobe circuit, the microcomputer-A 1 effects serial communication to cause the microcomputer-B 2 to turn off the power supply to the vibration detecting circuits 9, 10 and to shift the microcomputer-B 2 from the function state to the stand-by state. Subsequently the step S410 drives the focusing lens 18 from the initial position by AF steps determined in the step S403. In a next step S411, the microcomputer-A 1 sends, by serial communication to the microcomputer-B 2, a vibration indication data request command, in order to indicate the angular velocity detected by the vibration detecting circuits 9, 10 and calculated by the microcomputer-B 2, and vibration indicating data are transferred from the microcomputer-B 2 to the microcomputer-A 1. A step S412 drives the vibration state indicates 8 according to thus transferred data to indicate the vibration; a step S413 starts a timer; a step S414 discriminates whether the full-stroke switch 23 is on; then, if not, a step S415 discriminates whether the half-stroke switch 22 is on; and, if not, a step S416 discriminates whether the time of the timer has expired.

If the step S414 identifies that the full-stroke switch 23 is not on, the step S415 identifies that the halfstroke switch 22 is on and the step S416 identifies that the time of the timer has expired, the sequence returns to the step S411 in which the microcomputer-A 1 sends the vibration indication data request command to the microcomputer-B 2 and renews the indication of vibration. If the step S414 identifies that the full-stroke switch 23 is not on, the step S415 identifies that the half-stroke switch 22 is on and the step S416 identifies that the time of the timer has not expired, the sequence returns to the step S414 to discriminate the state of the full-stroke switch 23 again. If the step S414 identifies that the full-stroke switch 23 is not on and the step S415 identifies that the half-stroke switch 22 is not on, the sequence proceeds to a next step S417 in which the microcomputer-A 1 sends a vibration detecting circuit power-off command, for turning off the power supply to the vibration detecting circuits 9, 10 and terminating the detection of angular velocity, to the microcomputer-B 2 by serial communication. In a next step S418, the microcomputer-A 1 sends a stand-by shift command, for shifting the microcomputer-B 2 from the function state to the stand-by state, to the microcomputer-B 2 by serial communication. Then a step S419 turns off the indication of vibration, and the sequence proceeds from a step S420 to the step S207 in FIG. 2. If the step S414 identifies that the full-stroke switch 23 is on, the sequence proceeds to a step S420.

In summary, if the full-stroke switch 23 is turned on while the half-stroke switch 22 is on, the phototaking process is thereafter continued. In a state in which the full-stroke switch 23 is off but the half-stroke switch 22 is on, the vibration indication data are received and the indication of vibration is renewed upon every expiration of the time of the timer. Said timer serves to avoid a frequent change of the indication of vibration and to maintain said indication for a predetermined time. If the half-stroke switch 22 is turned off, the microcomputer-A 1 effects serial communication to cause the microcomputer-B 2 to turns off the power supply to the vibration correcting circuits 9, 10 and to shift said microcomputer-B 2 from the function state to the stand-by state. A next step S421 drives the vibration indicator 8 to turn off the indication of vibration, and the sequence proceeds to a step S501 in FIG. 5.

The step S501 discriminates whether a self-timer phototaking mode has been selected by the mode switch 24, and, if selected, a step S502 starts the self-timer and a step S503 discriminates whether the main switch 21 has been turned on. In case the step S501 identifies the self-timer phototaking mode and the step S503 identifies that the main switch 21 is turned off in the course of time measurement by the self-timer, there is executed a step S505 in which the microcomputer-A 1 sends the vibration detecting circuit power-off command, for turning off the power supply to the vibration detecting circuits 9, 10 and terminating the detection of angular velocity, to the microcomputer-B 2 by serial communication, then, in a next step S506, the microcomputer-A 1 sends the stand-by shift command, for shifting the microcomputer-B 2 from the function state to the stand-by state, to the microcomputer-B 2 by serial communication, and, in a next step S507, the sequence proceeds to the step S207 in FIG. 2.

If the step S501 identifies the self-timer phototaking mode and the step S503 identifies that the main switch 21 is on, a next step S504 discriminates whether the self-timer has expired, and, if not, the sequence returns to the step S503 to discriminate the state of the main switch 21 again, but, if expired, the sequence proceeds to a step S508. Also if the step S501 identifies that the self-timer phototaking mode is not selected, the sequence proceeds to the step S508. Thus the self-timer phototaking mode can be canceled by turning off the main switch 21 in the course of time measurement of the self-timer. In such case the microcomputer-A 1 effects serial communication to cause the microcomputer-B 2 to turn off the power supply to the vibration detecting circuits 9, 10 and to shift the microcomputer-B 2 from the function state to the stand-by state. In the step S508, the microcomputer-A 1 sends a correcting lens centering command, for driving the motor driving circuits 11, 12 so as to drive the vibration correcting lens 17 in order to bring the optical axis to the approximate center of the phototaking optical system, to the microcomputer-B 2 by serial communication. In a next step S509, the microcomputer-A 1 sends a vibration correcting control start command, for starting the vibration correcting command to drive the vibration correcting lens 17 according to the outputs of the angular velocity detecting circuits 9, 10 thereby varying the optical axis so as to cancel the vibration, to the microcomputer-B 2 by serial communication. A step S510 waits for a predetermined time, until the vibration correcting control by the microcomputer-B 2 becomes stable. A step S511 executes a shutter exposure process of a predetermined time, according to the EV value determined by the AE calculation in the step S403. In case of the strobe emission mode, the strobe flash emission is also executed during said shutter exposure process. In a next step S512, the microcomputer-A 1 sends a vibration correcting control stop command, for terminating the vibration correcting control, to the microcomputer-B 2 by serial communication. In a next step S513, the microcomputer-A 1 sends the vibration detecting circuit power-off command, for turning off the power supply to the vibration detecting circuits 9, 10 and terminating the detection of angular velocity, to the microcomputer-B 2 by serial communication. In a next step S514, the microcomputer-A 1 sends a correcting lens reset command, for driving the motor driving circuits 11, 12 to move the vibration correcting lens 17 to the initial reset position, to the microcomputer-B 2 by serial communication. In a next step S515, the microcomputer-A 1 sends the stand-by shift command, for shifting the microcomputer-B 2 from the function state to the stand-by state, to the microcomputer-B 2 by serial communication. A next step S516 drives the focusing lens 18 to the initial position, then a step S517 advances the exposed film by a frame, and a step S518 terminates the microcomputer-A 1 phototaking process, whereupon the sequence proceeds to the step S207 in FIG. 2.

Figure 6:
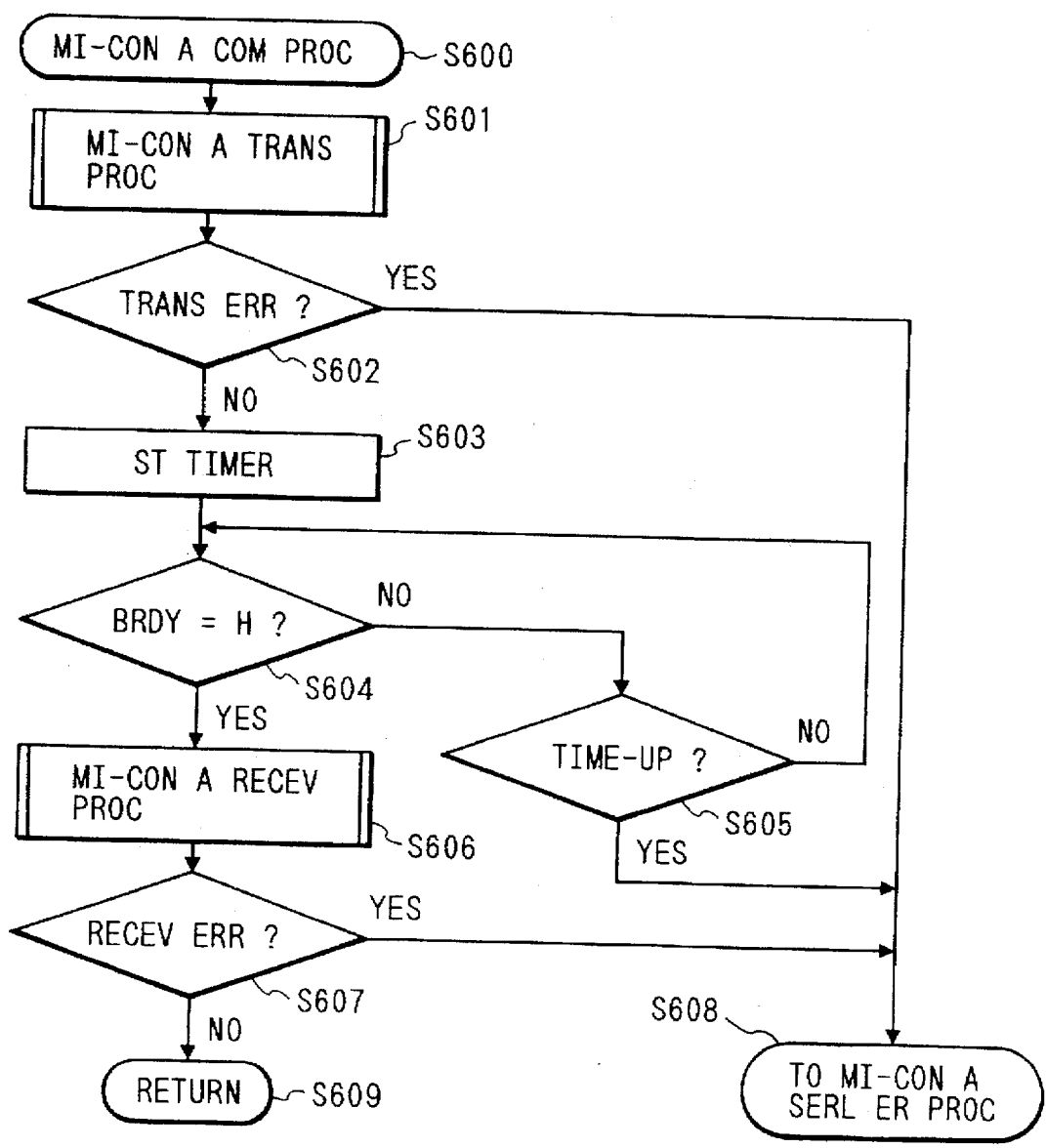
FIG. 6 is a flow chart showing a process of serial communication of the microcomputer-A with the microcomputer-B in the camera with a vibration correcting function according to the present invention.

FIG. 6 is a flow chart showing the serial communication process of the microcomputer-A 1, with the microcomputer-B 2, in the camera with a vibration correcting function according to the present invention.

This flow chart shows the detailed process of the stand-by shift command, the vibration detecting circuit power-on command, the vibration detecting circuit power-off command, the vibration indication data request command, the vibration correcting control start command, the vibration correcting control stop command, the correcting lens centering command, the correcting lens reset command and the distance/zoom position data transfer command mentioned in the foregoing, and the microcomputer-A 1 starts process from a step S600. In a step S601, the microcomputer-A 1 effects serial transmission (to be explained later) of command data in the first byte and data in the second byte to the microcomputer-B 2. A next step S602 discriminates whether a transmission error, to be explained later, has occurred in the transmission, and, if not, a step S603 starts a timer, and a step S604 discriminates whether the BRDY signal is at the H-level. If the BRDY signal is at the L-level, a next step S605 discriminates whether the timer has expired, and, if not, the sequence returns to the step S604 to discriminate the state of the BRDY signal again. If it is at the H-level, the sequence proceeds to a step S606, in which the microcomputer-A 1 executes serial reception (to be explained later) of the data from the microcomputer-B 2. A next step S607 discriminates whether a reception error has occurred in the reception, and, if not, a step S609 terminates the microcomputer-A 1 communication process, whereupon the sequence returns to the respective processes mentioned before. In case of a transmission error in the step S602, a time expiration in the step S605 or a reception error in the step S607, a serial communication error is identified, and the sequence proceeds to a step S608 for executing a serial error process, starting from a step S320 in FIG. 3. The microcomputer-B 2 executes a process according to the content of the transmission from the microcomputer-A 1 in the step S602, and after said process, shifts the BRDY signal to the H-level. The time expiration in the step S605, without shift of the BRDY signal to the H-level means that the microcomputer-B 2 did not function properly for some reason or that the serial communication was not conducted properly. In summary, a case of an error in the transmission of the microcomputer-A 1, a case of an error in the reception, or a case of time expiration without the shift of the BRDY signal to the H-level after the transmission, is regarded as a serial communication error, and the serial error process is executed in such cases.

Table 1 summarizes the processes of the microcomputer-B 2, the serial transfer data from A to B and the serial transfer data from B to A, corresponding to the processes of the microcomputer-A 1.

process shown in FIG. 2, the microcomputer-B 2 is released from the reset state and starts the sequence from a step S700. Also in case the main switch 21 or the half-stroke switch 22 is turned on, the microcomputer-A shifts the ARDY signal from the L-level to the H-level whereby the microcomputer-B 2 is released from the stand-by state by the wake-up function and starts the sequence from a step S740. In case the microcomputer-B 2 is released from the reset state, a step S701 initializes the interior of the microcomputer-B 2, and the sequence proceeds to a step S702, but, in case of release from the stand-by state, the sequence proceeds directly to the step S702. The step S702 starts a timer, then a step S703 discriminates the state of the ARDY signal, and, if at the L-level, a next step S704

TABLE 1

| Process of microcomputer A | Data transferred from A to B | | Process of microcomputer-B | Data transferred to A after process of microcomputer-B |
| --- | --- | --- | --- | --- |
| | 1st byte | 2nd byte | | |
| Stand-by shift command | 0 | 0 | Circuit cut-off | Process end (= 0) |
| Vib. det. circuit power-on command | 1 | 0 | Vib. det. circuit power-on process | Process end (= 0) |
| Vib. det. circuit power-off command | 2 | 0 | vib. det. circuit power-off process | Process end (= 0) |
| Vib. ind. data request command | 3 | 0 | Vib. ind. data calculation process | Vibration indicating data |
| Vib. cor. control start command | 4 | 0 | Vib. cor. control start process | Process end (= 0) |
| Vib. cor. control stop command | 5 | 0 | Vib. cor. control stop process | Process end (= 0) |
| Cor. lens centering command | 6 | 0 | Cor. lens centering process | Process end (= 0) |
| Cor. lens reset command | 7 | 0 | Cor. lens reset process | Process end (= 0) |
| Dist./zoom pos. data transfer process | 8 | Dist./zoom pos. | Cor. lens shift coef. calculation process | Process end (= 0) |

Table 1 shows an example of the data transferred from the microcomputer-A to B, the process to be executed by the microcomputer-B 2 according to the content of thus transferred data, and the data transferred from the microcomputer-B to A after said process. In a microcomputer-A transmission process in a step S601 in FIG. 6, at first command data of 0, 1, 2, 3, 4, 5, 6, 7 or 8 is transferred to the microcomputer-B 2, respectively corresponding to the stand-by shift command, vibration detecting circuit power-on command, vibration detecting circuit power-off command, vibration indicating data request command, vibration correcting control start command, vibration correcting control stop command, correcting lens centering command, correcting lens reset command or distance/zoom position data transfer process mentioned above. Then, as the data of 2nd byte, 0 in the first eight cases or the data of distance and zoom position in case of the distance/zoom position data transfer process, is transferred to the microcomputer-B 2. Subsequently the microcomputer-B 2 executes the process shown in Table 1, depending on the content of such data transferred from the microcomputer-A 1 according to a process to be explained later with reference to FIGS. 7A and 7B, and, after said process, transfers data shown in Table 1 to the microcomputer-A 1 by a microcomputer-B 2 transmission process of a step S725 shown in FIG. 7B (such transferred data being hereinafter called response data).

Figure 7B:
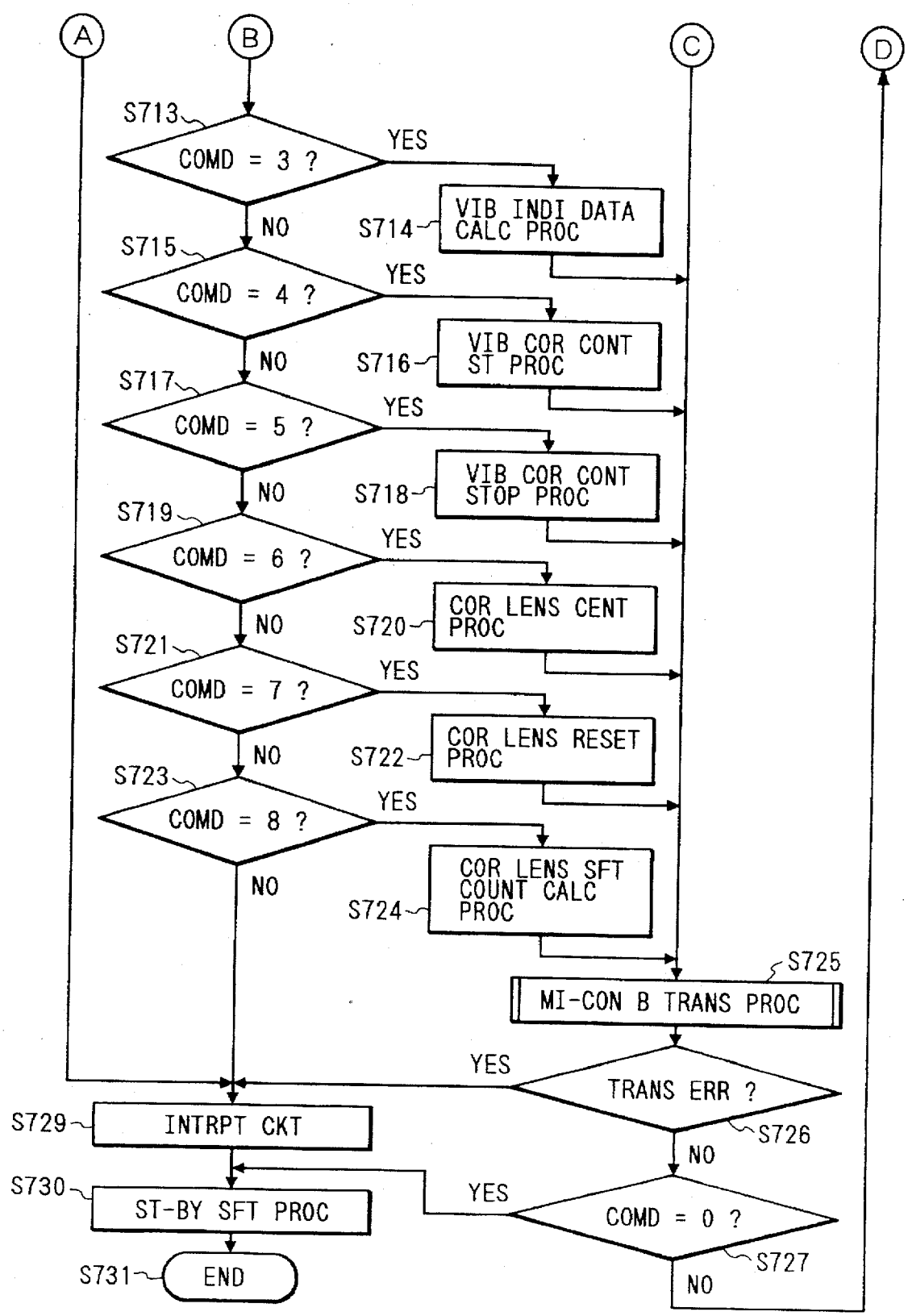
FIG. 7 is comprised of FIGS. 7A and 7B each showing a flow chart of a process of serial communication of the microcomputer-B with the microcomputer-A and other processes in the camera with a vibration correcting function according to the present invention.

FIGS. 7A and 7B are flow charts showing the sequence to be executed by the microcomputer-B 2 in the camera with a vibration correcting function according to the present invention. When the microcomputer-A 1 shifts the RESET signal from the L-level to the H-level in the power supply start discriminates whether the timer has expired. If not, the sequence returns to the step S703 to discriminate the state of the ARDY signal again. If the ARDY signal is at the H-level, a next step S705 effects a reception process (to be explained later) in which the microcomputer-B 2 receives command data in the 1st byte and data in the 2nd byte from the microcomputer-A by serial communication. Then a step S706 discriminates presence of an error in the reception process, and, if absent, the sequence proceeds to a step S707.

Steps S707 to S724 identify the received command data and execute a corresponding process. If a step S707 receives a stand-by shift command with command data 0 from the microcomputer-A 1 by serial communication, a next step S708 shuts off the vibration detecting circuits 9, 10, motor driving circuits 13, 14 and lens position detecting circuits 19, 20 and the sequence proceeds to a step S725. If a step S709 receives a vibration detecting circuit power-on command with command data 1 from the microcomputer-A 1 by serial communication, a next step S710 executes the vibration detecting circuit power-on process, for turning on the power supply to the vibration detecting circuits 9, 10 thereby initiating the detection of angular velocity generated by vibration, and the sequence then proceeds to the step S725. If a step S711 receives a vibration detecting circuit power-off command with command data 2 from the microcomputer-A 1 by serial communication, a next step S712 executes the vibration detecting circuit power-off process, for turning off the power supply to the vibration detecting circuits 9, 10 thereby terminating the detection of angular velocity, and the sequence proceeds to the step S725. If a step S713 receives a vibration indicating data request command with command data 3 from the microcomputer-A 1 by serial communication, a next step S714 executes the calculation of vibration indicating data, for driving the vibration state indicator 8 according to the angular velocity detected by the vibration detecting circuits 9, 10, and the sequence proceeds to the step S725. If a step S715 receives a vibration correcting control start command with command data 4 from the microcomputer-A 1 by serial communication, a next step S716 executes the vibration correcting control start process for starting the vibration correcting control for driving the vibration correcting lens 17 according to the outputs of the vibration detecting circuits 9, 10 thereby varying the optical axis so as to cancel the vibration, and the sequence proceeds to the step S725. If a step S717 receives a vibration correcting control stop command with command data 5 from the microcomputer-A 1 by serial communication, a next step S718 executes the process for terminating the vibration correcting control, and the sequence proceeds to the step S725. If a step S719 receives a correcting lens centering command with command data 6 from the microcomputer-A 1 by serial communication, a next step S720 executes the correcting lens centering process for driving the motor driving circuits 11, 12 for shifting the vibration correcting lens 17 in such a manner that the optical axis comes to the approximate center of the phototaking optical system, and the sequence proceeds to the step S725. If a step S721 receives a correcting lens reset command with command data 7 from the microcomputer-A 1 by serial communication, a next step S722 executes the correcting lens reset process for driving the motor driving circuits 11, 12 in order to drive the vibration correcting lens 17 to the reset position, and the sequence proceeds to the step S725. If a step S723 receives a distance/zoom position data transfer process with command data 8 from the microcomputer-A 1 by serial communication, a next step S724 executes the correcting lens shift coefficient calculating process, for calculating the shift coefficient of the correcting lens based on the data of distance and zoom position required for the vibration correcting control, and the sequence proceeds to the step S725. Said coefficient indicates the target velocity of shifting of the vibration correcting lens 17 for appropriately correcting the vibration, with respect to the angular velocity of the camera resulting from vibration and obtained by A/D conversion of the outputs of the vibration detecting circuits 9, 10, and is variable dependent on the distance to the object and also on the focal length of the phototaking optical system in case of a zooming optical system. The correcting lens shift coefficient calculation process is to calculate said coefficient for appropriate correction of vibration, through a predetermined calculation process, based on the data of the distance and zoom position. Then the step S725 executes a transmission process (to be explained later) for sending data by serial communication from the microcomputer-B 2 to A, and a step S726 discriminates presence of an error in said transmission process. If absent, a next step S727 discriminates whether the command data in the serial communication from the microcomputer-B to A is 0, and, if not 0, a step S728 discriminates whether the microcomputer-A 1 has shifted the ARDY signal to the H-level for a next serial communication. If at the L-level, the discrimination is repeated until the ARDY signal is shifted to the H-level. If the ARDY signal is at the H-level, the sequence proceeds to the step S705 to repeat the above-explained process. In case of timer expiration in the step S704, a reception error in the step S706, or a transmission error in the step S726, a serial communication error is identified and the sequence proceeds to a step S729 for effecting circuit shut-off, for shutting off the vibration detecting circuits 9, 10, motor driving circuits 13, 14 and lens position detecting circuits 19, 20, and then to a step S730. In case the discriminations in the steps S707, S709, S711, S713, S715, S717, S719, S721 and S723 are all negative, namely in case the command data received in the step S705 is none of 0–8 and impossible, the sequence likewise proceeds to the step S729 for shutting off the vibration detecting circuits 9, 10, motor driving circuits 13, 14 and lens position detecting circuits 19, 20, and then to the step S730. Also if, in the step S727, the command data sent from the microcomputer-B to A by serial communication is 0, the sequence proceeds to the step S730.

The step S730 executes the stand-by shift process for shifting the microcomputer-B 2 from the function state to the stand-by state, and then a step S731 terminates the microcomputer-B reset or stand-by state releasing process.

In summary, in case of a transmission error in the transmission process of the microcomputer-B or a reception error in the reception process, or in case the microcomputer-B is released from the reset state but the timer has expired without shifting of the ARDY signal to the H-level, or in case the release of the microcomputer-B from the stand-by state is tried but the timer has expired without shifting of the ARDY signal to the H-level, or in case the command data received by the microcomputer-B is not any of the predetermined values, where are shut off the vibration detecting circuits 9, 10 motor driving circuits 13, 14 and lens position detecting circuits 19, 20 and the microcomputer-B 2 is shifted to the stand-by state. Also in case the stand-by shift command is transferred from the microcomputer-A, there is conducted the similar circuit shut-off and the microcomputer-B is shifted to the stand-by state.

In the reset releasing process started from the step S700, the timer started in the step S702 is to avoid battery consumption by the eventual shift of the vibration detecting circuits 9, 10, motor driving circuits 13, 14 and lens position detecting circuits 19, 20, after the resetting of the microcomputer-B, in case a noise appears on the RESET signal line. In the absence of serial communication from the microcomputer-A before the expiration of the timer started in the step S702, the steps S729 and S730 shut off the vibration detecting circuits 9, 10, motor driving circuits 13, 14 and lens position detecting circuits 19, 20 and shifts the microcomputer-B to the stand-by state.

Also in the stand-by releasing process starting from the step S740, the timer started in the step S702 is to avoid battery consumption by the eventual shift of the microcomputer-B from the stand-by state to the function state, in case a noise appears on the ARDY signal line. In the absence of the serial communication from the microcomputer-A before the expiration of the timer started in the step S702, the steps S729 and S730 shut off the vibration detecting circuits 9, 10, motor driving circuits 13, 14 and lens position detecting circuits 19, 20 and shift the microcomputer-B to the stand-by state.

Figure 8B:
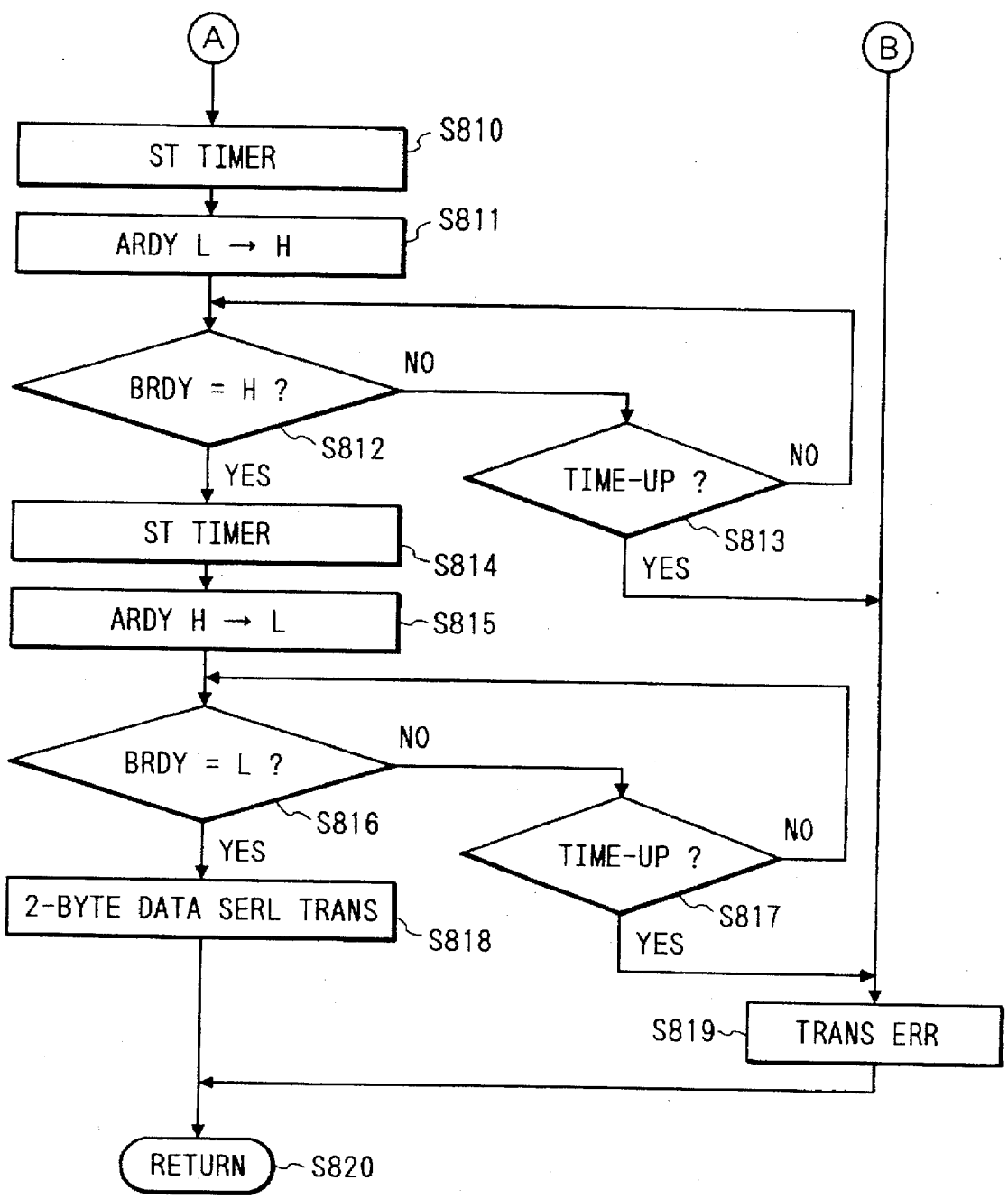
FIG. 8 is comprised of FIGS. 8A and 8B, each showing a flow chart of a transmission process of the microcomputer-A to the microcomputer-B in the camera with a vibration correcting function according to the present invention.

FIGS. 8A and 8B are flow charts showing the transmission process of the microcomputer-A 1, to the microcomputer-B 2, in the camera with a vibration correcting function according to the present invention. The microcomputer-A transmission process in the step S601 in FIG. 6 is started from a step S800 in FIG. 8A. A step S801 starts a timer, then a step S802 shifts the ARDY signal from the L-level to the H-level (timing t1 in FIG. 12), and a step S803 discriminates whether the BRDY signal is at the H- or L-level. If at the L-level, a step S804 discriminates whether the timer has expired, and, if not, the sequence returns to the step S803 to discriminate the state of the BRDY signal again. If the BRDY signal is at the H-level (timing t2 in FIG. 12), a step S805 starts a timer, than a step S806 shifts the ARDY signal from the H-level to the L-level (timing t3 in FIG. 12), and a step S807 discriminates the state of the BRDY signal. If at the H-level, a next step S808 discriminates whether the timer has expired, and, if hot, the sequence returns to the step S807 to discriminate the state of the BRDY signal again. If at the L-level (timing t4 in FIG. 12), in a next step S809, the microcomputer-A 1 releases the SO signal synchronized with the SCK signal, thereby sending command data to the microcomputer-B 2 by serial communication (timing t5 to t6 in FIG. 12; 1st byte of the data transferred from the microcomputer A to B in Table 1). In this state the microcomputer-B 2 serially receives the command data from the microcomputer-A 1 by entering the SO signal synchronized with the SCK signal. Then a step S810 starts a timer, a step S811 shifts the ARDY signal from the L-level to the H-level (timing t7 in FIG. 12), and a step S812 discriminates the state of the BRDY signal. If at the L-level, a next step S813 discriminates whether the timer has expired, and, if not, the sequence returns to the step S812 to discriminate the state of the BRDY signal again. If the BRDY signal is at the H-level (time t8 in FIG. 12), a step S814 starts a timer, then a step S815 shifts the ARDY signal from the H-level to the L-level (time t9 in FIG. 12), and a step S816 discriminates the state of the BRDY signal. If at the H-level, a next step S817 discriminates whether the timer has expired, and, if not, the sequence returns to the step S816 to discriminate the state of the BRDY signal again. If at the L-level (time t10 in FIG. 12), in a next step S818, the microcomputer-A 1 releases the SO signal in synchronization with the SCK signal, thereby sending data of the 2nd byte to the microcomputer-B 2 by serial communication (time t11 to t12 in FIG. 12; 2nd byte of the data transferred from the microcomputer A to B in Table 1). In this state the microcomputer-B 2 serially receives the data of the 2nd byte from the microcomputer-A 1, by entering the SO signal in synchronization with the SCK signal. Then the sequence proceeds to a step S820.

In case the step S803 identifies the L-level state of the BRDY signal and the step S804 identifies expiration of the timer, the sequence proceeds to a step S819 in which a transmission error is identified. In case the step S807 identifies the H-level state of the BRDY signal and the next step S808 identifies expiration of the timer, the step S819 likewise identifies a transmission error. Also in case the step S812 identifies the L-level state of the BRDY signal and the next step S813 identifies expiration of the timer, the step S819 identifies a transmission error. Also in case the step S816 identifies the H-level state of the BRDY signal and the next step S817 identifies expiration of the timer, the step S819 identifies a transmission error. Then a next step S820 terminates the microcomputer-A transmission process, and the sequence proceeds to the step S602 in FIG. 6.

In summary, if, after the ARDY signal is shifted from the L-level to the H-level by the microcomputer-A 1, the BRDY signal is not shifted from the L-level to the H-level within the predetermined time of the timer in the reception process of the microcomputer-B 2 to be explained later, or, if, after the ARDY signal is shifted from the H-level to the L-level by the microcomputer-A 1, the BRDY signal is not shifted from the H-level to the L-level within the predetermined time of the timer in the reception process of the microcomputer-B 2, a transmission error is identified and there is executed the aforementioned serial error process.

As explained in the foregoing, the timer is used for detecting that the microcomputer-B 2 has become incapable of proper function for some reason, or that the serial communication has not been properly established.

Figure 9B:
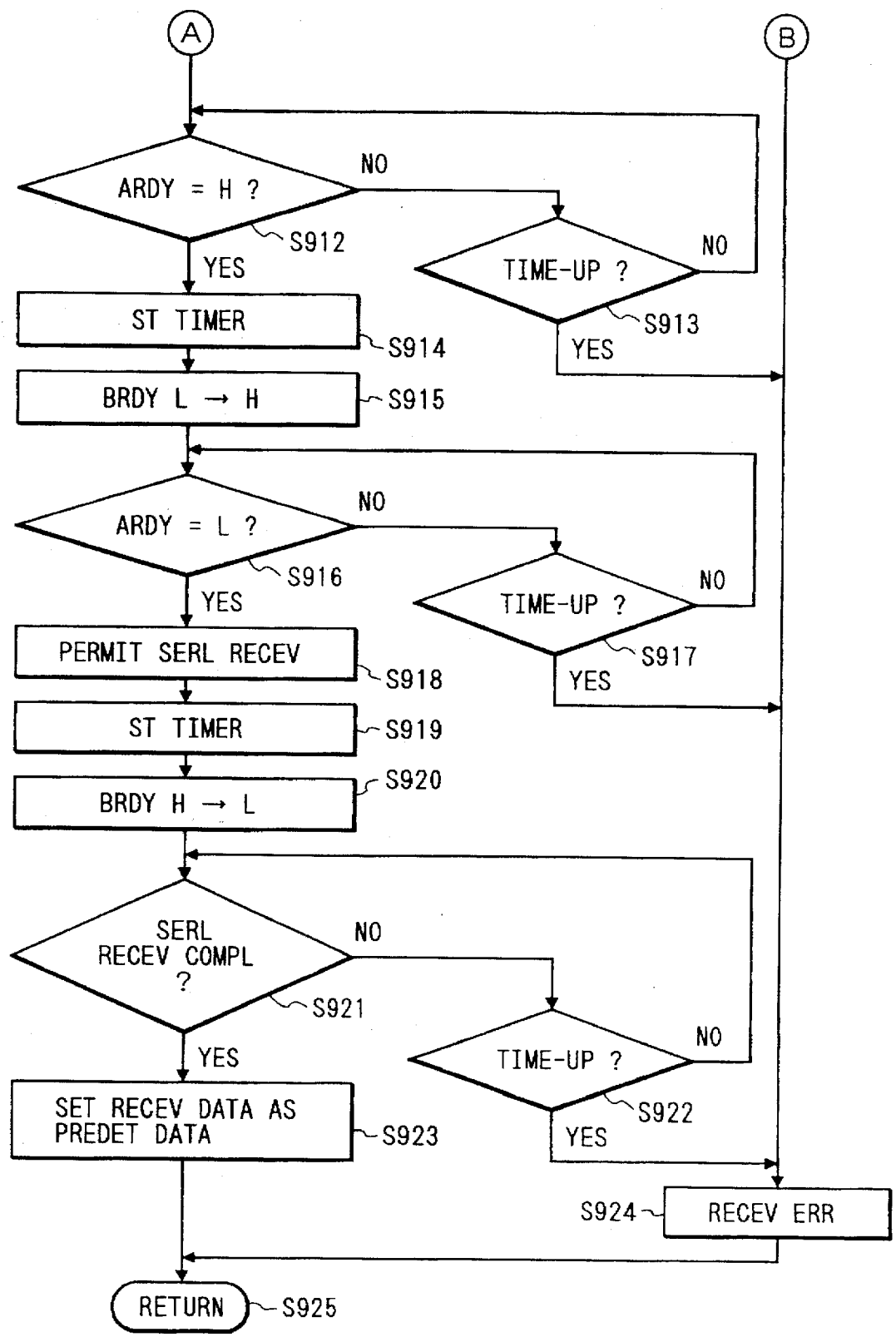
FIG. 9 is comprised of FIGS. 9A and 9B, each showing a flow chart of a reception process of the microcomputer-B from the microcomputer-A in the camera with a vibration correcting function according to the present invention.

FIGS. 9A and 9B are flow charts showing the reception process of the microcomputer-B 2, from the microcomputer-A 1, in the camera with a vibration correcting function according to the present invention. The microcomputer-B transmission process in the step S705 in FIG. 7A is started from a step S900 in FIG. 9A. A step S901 starts a timer, then a step S902 shifts the BRDY signal from the L-level to the H-level (timing t2 in FIG. 12), and a step S903 discriminates whether the ARDY signal is at the H- or L-level. If at the H-level, a next step S904 discriminates whether the timer has expired, and, if not, the sequence returns to the step S903 to discriminate the state of the ARDY signal again. If the ARDY signal is at the L-level (time t3 in FIG. 12), a step S905 enables serial reception of the microcomputer-B 2, thus enabling to receive the data transmitted from the microcomputer-A 1. A next step S906 starts a timer, and a step S907 shifts the BRDY signal from the H-level to the L-level (time t4 in FIG. 12), whereby the microcomputer-A 1 detects said L-level state of the BRDY signal and starts the transfer of command data to the microcomputer-B 2 (time t5 in FIG. 12; 1st byte of the data transferred from the microcomputer A to B in Table 1). Then a next step S908 discriminates whether the serial reception of command data has been completed, and, if not, a next step S909 discriminates whether the timer has expired. If not, the sequence returns to the step S908 to discriminate again whether the serial reception has been completed. If completed (time t6 in FIG. 12), a step S910 sets the received data as the predetermined data, then a step S911 starts a timer, and a step S912 discriminates the state of the ARDY signal. If at the L-level, a next step S913 discriminates whether the timer has expired, and, if not, the sequence returns to the step S912 to discriminate again the state of the ARDY signal. If the ARDY signal is at the H-level (time t7 in FIG. 12), a step S914 starts a timer, then a step S915 shifts the BRDY signal from the L-level to the H-level (time t8 in FIG. 12), and a step S916 discriminates the state of the ARDY signal. If at the H-level, a next step S917 discriminates whether the timer has expired, and, if not, the sequence returns to the step S916 to discriminate again the state of the ARDY signal. If at the L-level (time t9 in FIG. 12), a step S918 enables serial reception of the microcomputer-B 2, thereby enabling to receive data transmitted from the microcomputer-A 1. Then a step S919 starts a timer, and a step S920 shifts the BRDY signal from the H-level to the L-level (time t10 in FIG. 12), whereby the microcomputer-A 1 detects the L-level state of the BRDY signal as explained before and transfers the data of the 2nd byte to the microcomputer-B 2 (time t11 in FIG. 12; 2nd byte of the data transferred from the microcomputer A to B in Table 1). Then a step S921 discriminates whether the serial reception of the data of 2nd byte has been completed, and, if not, a next step S922 discriminates whether the timer has expired. If not, the sequence returns to the step S921 to discriminate again whether the serial reception has been completed. If the serial reception has been completed (time t12 in FIG. 12), a step S923 sets the received data as the predetermined data, and the sequence proceeds to a step S925.

A transmission error is identified in a step S924 in case the step S903 identifies the H-level state of the ARDY signal and the next step S904 identifies expiration of timer, or in case the step S908 identifies that the serial reception has not been completed and the next step S909 identifies expiration of the timer, or in case the step S912 identifies the L-level state of the ARDY signal and the next step S913 identifies expiration of the timer, or in case the step S916 identifies the H-level state of the ARDY signal and the next step S917 identifies expiration of the timer, or in case the step S921 identifies that the serial reception has not been completed and the next step S922 identifies expiration of the timer. Then a next step S925 terminates the microcomputer-B reception process and the sequence proceeds to the step S706 in FIG. 7A.

In summary, if, after the BRDY signal is shifted from the L-level to the H-level by the microcomputer-B 2, the ARDY signal is not shifted from the L-level to the H-level by the aforementioned microcomputer-A reception process within a predetermined time of the timer, or, if, after the BRDY signal if shifted from the H-level to the L-level by the microcomputer-B, the ARDY signal is not shifted from the H-level to the L-level by the aforementioned microcomputer-A reception process within a predetermined time of the timer, or if the serial reception of the microcomputer-B 2 is not completed within a predetermined time of the timer, a reception error is identified and the aforementioned serial error process is executed.

As explained in the foregoing, the timer is used for detecting that the microcomputer-A 1 has become incapable of proper function for some reason, or that the serial communication has not properly been established.

Figure 10:
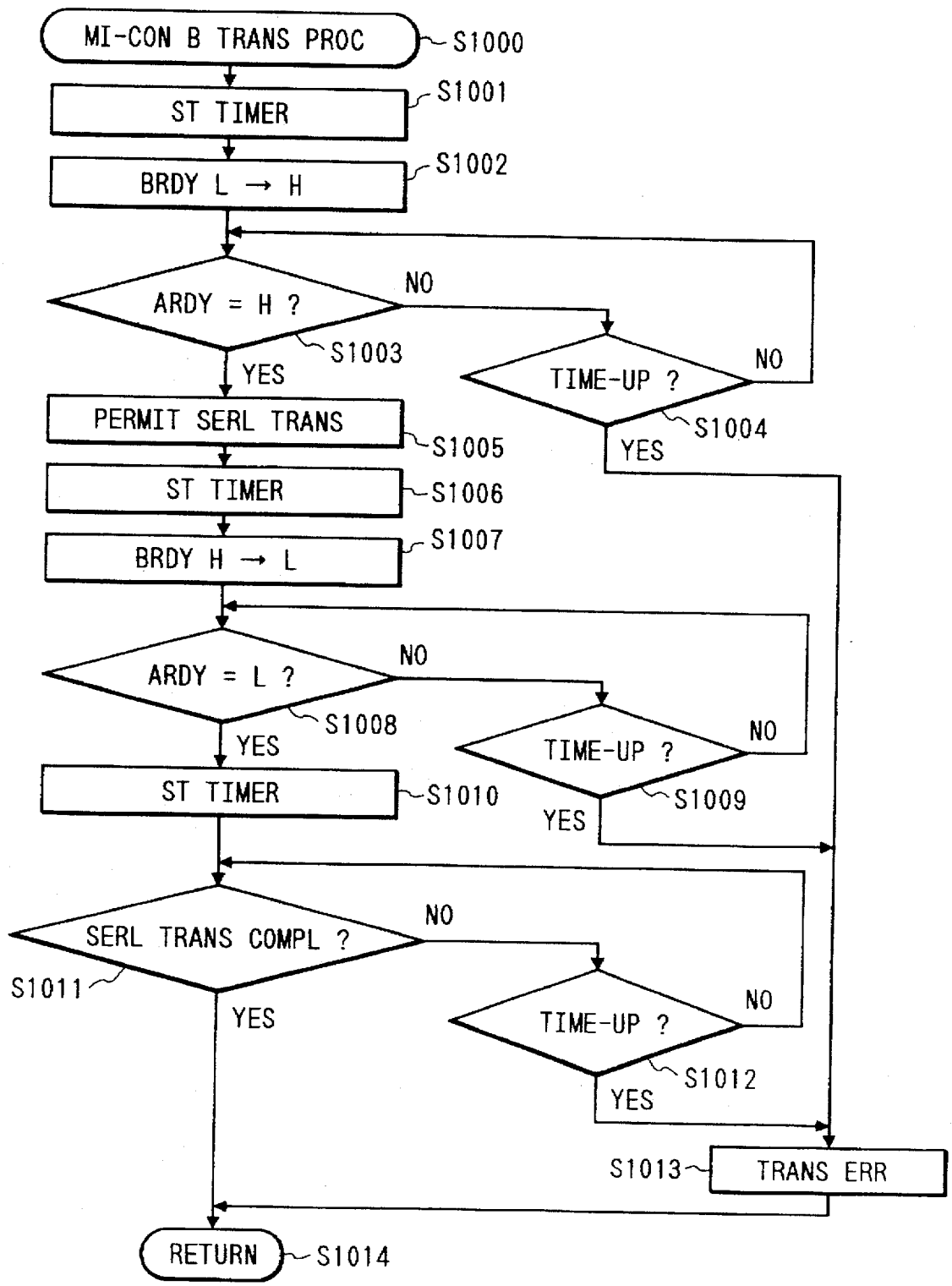
FIG. 10 is a flow chart showing a transmission process of the microcomputer-B to the microcomputer-A in the camera with a vibration correcting function according to the present invention.
Figure 13:
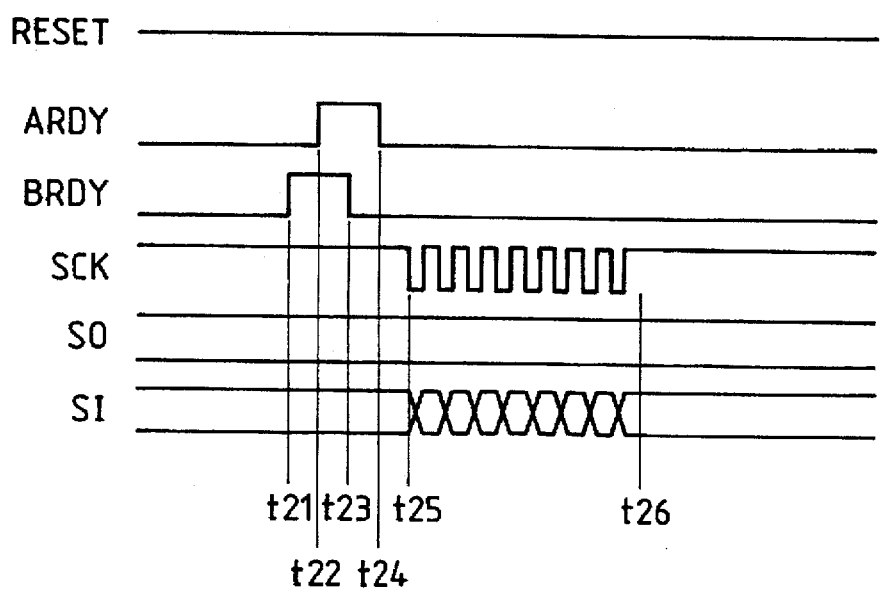
FIG. 13 is a timing chart showing an example of communication from the microcomputer-B to the microcomputer-A according to the present invention.

FIG. 10 is a flow chart showing the transmission process of the microcomputer-B 2, to the microcomputer-A 1, of the camera with a vibration correcting function according to the present invention. The microcomputer-B transmission process in the step S725 in FIG. 7B is started from a step S1000 in FIG. 10. A step S1001 starts a timer, then a step S1002 shifts the BRDY signal from the L-level to the H-level (time t21 in FIG. 13), and a step S1003 discriminates whether the ARDY signal is at the H- or L-level. If at the L-level, a next step S1004 discriminates whether the timer has expired, and, if not, the sequence returns to the step S1003 to discriminate again the state of the ARDY signal. If the ARDY signal is at the H-level (time t22 in FIG. 13), a step S1005 enables the serial communication of the microcomputer-B 2, thereby enabling in response to the entry of the SCK signal from the microcomputer-A, the microcomputer-B to transmit the response data from SI to the microcomputer-A 1 in synchronization with the SCK signal.

A next step S1006 starts a timer, and a step S1007 shifts the BRDY signal from the H-level to the L-level (time t23 in FIG. 13), and a step S1008 discriminates whether the ARDY signal is at the H- or L-level. If at the H-level, a next step S1009 discriminates whether the timer has expired, and, if not, the sequence returns to the step S1008 to discriminate again the state of the ARDY signal. If the ARDY signal is at the L-level (time t24 in FIG. 13), a step S1010 starts a timer, and the microcomputer-B 2 releases the SI signal in synchronization with the SCK signal, thereby starting serial communication of the response data to the microcomputer-A 1 (time t25 in FIG. 13; data to be transferred to the microcomputer-A after the process by the microcomputer-B in Table 1). In this state the microcomputer-A serially receives the response data from the microcomputer-B 2 by entering the SI signal synchronized with the SCK signal. A next step S1011 discriminates whether the serial communication of the response data has been completed, and, if not, a next step S1012 discriminates whether the timer has expired. If not, the sequence returns to the step S1011 to discriminate again whether the serial communication has been completed. If the serial communication has been completed (time t26 in FIG. 13), the sequence proceeds to a step S1014.

A transmission error is identified in a step S1013, in case the step S1003 identifies the L-level state of the ARDY signal and the next step S1004 identifies expiration of the timer, or in case the step S1008 identifies the H-level state of the ARDY signal and the next step S1009 identifies expiration of the timer, or in case the step S1011 identifies that the serial communication has not been completed and the next step S1012 identifies expiration of the timer.

A next step S1014 terminates the microcomputer-B transmission process, and the sequence proceeds to the step S726 in FIG. 7B.

In summary, if, after the BRDY signal is shifted from the L-level to the H-level by the microcomputer-B 2, the ARDY signal is not shifted from the L-level to the H-level within the predetermined time of the timer by the aforementioned microcomputer-A reception process, or, if, after the BRDY signal is shifted from the H-level to the L-level by the microcomputer-B 2, the ARDY signal is not shifted from the H-level to the L-level within the predetermined time of the timer by the aforementioned microcomputer-A reception process, or if the serial communication of the microcomputer-B is not completed within the predetermined time of the timer, a transmission error is identified and the aforementioned serial error process is executed.

Figure 11:
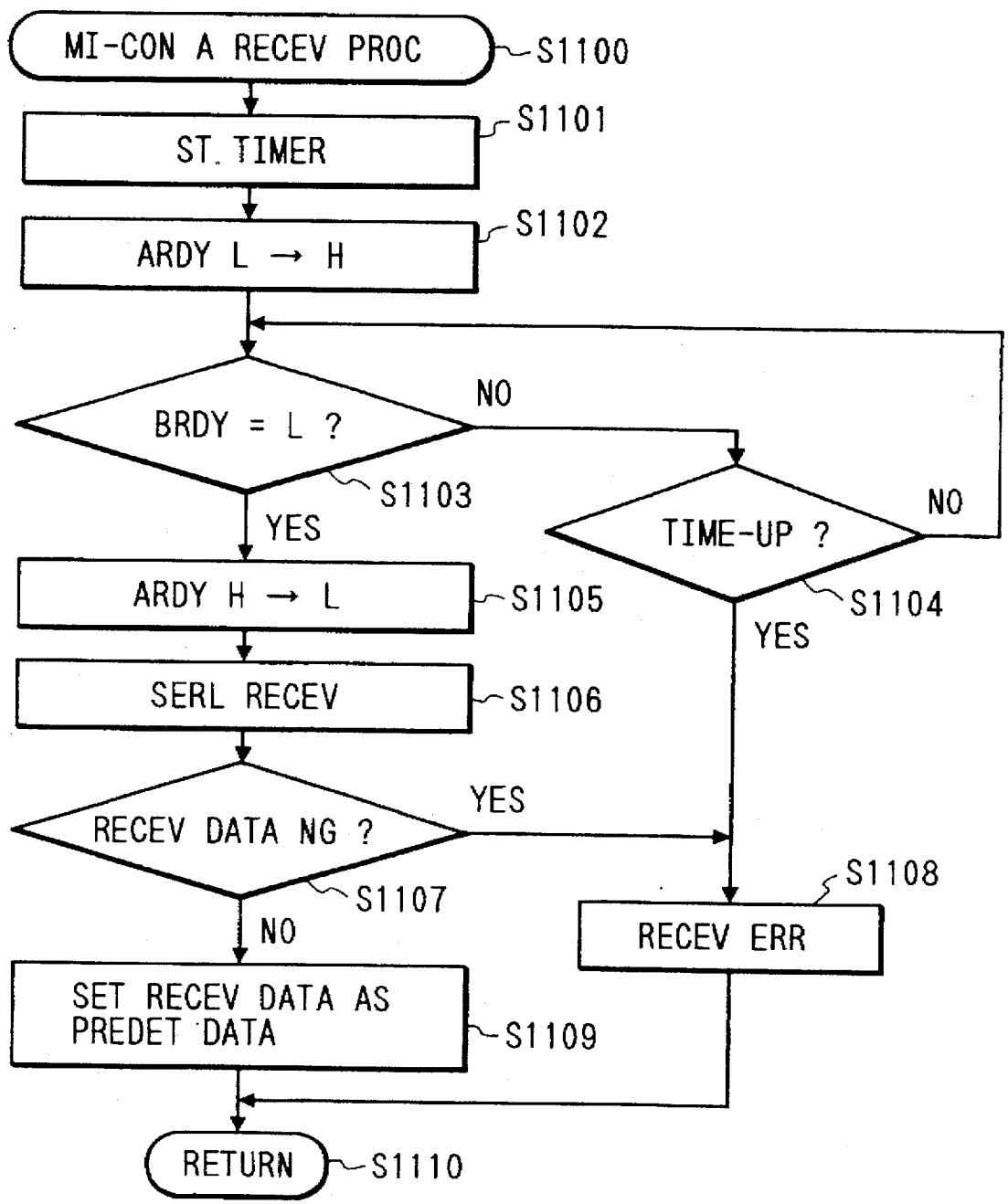
FIG. 11 is a flow chart showing a reception process of the microcomputer-A from the microcomputer-B in the camera with a vibration correcting function according to the present invention.

FIG. 11 is a flow chart showing the reception process of the microcomputer-A 1, from the microcomputer-B 2, in the camera with a vibration correcting function according to the present invention. The microcomputer-A reception process in the step S606 in FIG. 6 is started from a step S1100 in FIG. 11. A step S1101 starts a timer, than a step S1102 shifts the ARDY signal from the L-level to the H-level (time t22 in FIG. 13), and a step S1103 discriminates whether the BRDY signal is at the H- or L-level. If at the H-level, a next step S1104 discriminates whether the timer has expired, and, if not, the sequence returns to the step S1103 to discriminate again the state of the BRDY signal. If the BRDY signal is at the L-level (time t23 in FIG. 13), a step S1105 shifts the ARDY signal from the H-level to the L-level (time t24 in FIG. 13). In a next step S1106, the microcomputer-A 1 fetches the SI signal synchronized with the SCK signal, thereby serially receiving the response data from the microcomputer-B 2 (time t25 to t26 in FIG. 13; data transferred to the microcomputer-A after the process by the microcomputer-B in Table 1). In this state, the microcomputer-B 2 releases the SI signal synchronized with the SCK signal, thereby serially transmitted the response data to the microcomputer-A 1. After the completion of the serial communication, a step S1107 discriminates whether the received response data are normal, and, if normal, a step S1109 sets the received data as the predetermined data, and the sequence proceeds to a step S1110.

A reception error is identified in a step S1108 in case the step S1103 identifies the H-level state of the BRDY signal and the next step S1104 identifies expiration of the timer, or in case the step S1107 identifies that the received response data are not normal, i.e. said are impossible. The impossible case means that the response data, transmitted by the microcomputer-B to A, is other than those shown in Table 1.

A next step S1110 terminates the microcomputer-A reception process, and the sequence proceeds to the step S607 in FIG. 6.

In summary, if, after the ARDY signal is shifted from the L-level to the H-level by the microcomputer-A 1, the BRDY signal is not shifted from the H-level to the L-level with the predetermined time of the timer, by the aforementioned microcomputer-B transmission process, or if the response data received by the microcomputer-A 1 is not normal, a reception error is identified and the aforementioned serial error process is executed.

As explained in the foregoing, the timer is used for detecting that the microcomputer-A 1 has become incapable of proper function for some reason, or that the serial communication has not properly been established.

As explained in the foregoing, the present invention provides following effects.

The camera of the present invention, being capable of switching the stopped state and the function state of the vibration correcting control device by the control signal from the main control device, can dispense with a reset IC attached to said vibration correcting control device and also with the mounting area for said reset IC.

Also in the camera of the present invention, as the vibration correcting control device is released from the stopped state at the start of power supply to the camera by the control signal from the main control device to said vibration correcting control device, a reset IC can be dispensed with and the vibration correcting control device can be activated simultaneously with the main control device at the start of power supply.

Also in the camera of the present invention, as the vibration correcting control device is adapted to cut off the power supply to the vibration detecting device and the driving device in case said control device detects an absence of serial communication from the main control device within the predetermined time after the release from the stopped state, there can be reduced the power consumption in said vibration detecting device and driving device and there can be prevented generation or expansion of troubles, even in case of an erroneous function of said vibration correcting control device by an eventual noise on the control signal.

Also in the camera of the present invention, as the vibration correcting control device is adapted to shift to the stand-by state in case said control device detects an absence of serial communication from the main control device within the predetermined time after the release from the stopped state, there can be reduced the power consumption in said vibration correcting control device even in case of an erroneous function thereof by an eventual noise on the control signal.

Also in the camera of the present invention, as the stand-by state and the function state of the vibration correcting control device can be switched by the serial data transfer between the main control device and the vibration correcting control device, there can be reduced the power consumption in the vibration correcting control device by switching to the stand-by state when the correction of vibration is not conducted.

Also in the camera of the present invention, as the vibration correcting control device can be released from the stand-by state and enter the function state by the signal on at least one of the electrically connected signal lines for serial data transfer, there can be reduced the power consumption in said vibration correcting control device and the correction of vibration can be controlled therein as in the conventional manner.

Also in the camera of the present invention, as the vibration correcting control device can be released from the stand-by state and enter the function state by the serial data transfer between the main control device and the vibration correcting control device in response to the operation of the half-stroke switch member by the shutter release button for executing the phototaking operation of the camera, there can be reduced the power consumption in said vibration correcting control device and said control device can be rendered capable of vibration correcting control in response to the operation of the half-stroke switch.

Also in the camera of the present invention, as the vibration correcting control device can be released from the stand-by state and enter the function state by the serial data transfer between the main control device and the vibration correcting control device in response to the operation of the main switch operating member for enabling the phototaking operation of the camera, there can be reduced the power consumption in said vibration correcting control device and said control device can be rendered capable of control in response to the operation of said main switch operating member.

Also in the camera of the present invention, as the vibration correcting control device is shifted from the function state to the stand-by state by the serial data transfer between the main control device and said vibration correcting control device in response to the completion of exposure process of the camera, there can be reduced the power consumption in said vibration correcting control device when the control thereby is not required after the completion of the exposure process.

Also in the camera of the present invention, as the vibration correcting control device is shifted from the function state to the stand-by state by serial data transfer between the main control device and the vibration correcting control device, in response to the cancellation of the operation of the half-stroke switch operating member, there can be reduced the power consumption in said vibration correcting control device when the control therein is not required.

Also in the camera of the present invention, in case the camera is further provided with an electronic flash unit and in case of the exposure process involving the flash emission of said electronic flash unit, since the vibration correcting control device is shifted from the function state to the stand-by state by serial data transfer between the main control device and the vibration correcting control device if said electronic flash unit is identified as uncharged, there can be reduced the power consumption in said vibration correcting control device when the control therein is not required.

Also in the camera of the present invention, as the vibration correcting control device is shifted from the function state to the stand-by state by the serial data transfer between the main control device and the vibration correcting control device if the self-timer phototaking process is canceled in the course of time measurement by the self-timer of the camera, there can be reduced the power consumption in said vibration correcting control device when the control therein is not required.

Also in the camera of the present invention, since, after the vibration correcting control device drives the optical axis varying device to the predetermined reference position in response to the start of power supply to the camera, said vibration correcting control device is shifted from the function state to the stand-by state by serial data transfer between the main control device and said vibration correcting control device, there can be reduced the power consumption in said vibration correcting control device when the control therein is not required.

Also in the camera of the present invention, the vibration correcting control device is shifted from the function state to the stand-by state in case the serial data transfer from the main control device to the vibration correcting control device is not conducted within the predetermined time after said vibration correcting control device is released from the stand-by state. Consequently, even if the vibration correcting control device is shifted from the stand-by state to the function state by the eventual noise on the signal line for serial data transfer, it returns to the stand-by state after the lapse of the predetermined time and there can thus be reduced the power consumption in said control device.

Also in the camera of the present invention, the vibration correcting control device is adapted to cut off the power supply to the vibration detecting device and the driving device in case the serial data transfer from the main control device to the vibration correcting control device is not conducted within the predetermined time after said vibration correcting control device is released from the stand-by state. Consequently, even if the vibration correcting control device is shifted from the stand-by state to the function state and turns on the power supply to the vibration detecting device and the driving device by the eventual noise on the signal line for serial data transfer, said power supply to the vibration detecting device and the driving device is cut off after the lapse of the predetermined time and the power consumption therein can thus be reduced.

Also in the camera of the present invention, the main control device is adapted to shift the vibration correcting control device from the function state to the stopped state by the output signal from the main control device to the vibration correcting control device, utilizing at least one of the electrically connected signal line, in case the main control device detects abnormality in the serial data communication. Consequently the error in the serial communication does not result in the uncontrolled function of the vibration correcting control device or independent correction thereof on vibration, and there can be reduced the power consumption in the devices required in the correction of vibration, such as the driving device, and also be prevented the generation of expansion of troubles.

Also in the camera of the present invention, the main control device is adapted to shift the vibration correcting control device from the function state to the stopped state by the signal utilizing at least one of the electrically connected signal lines, in case the serial data communication from said vibration correcting control device to the main control device is not conducted within the predetermine time after the serial data communication therefrom to the vibration correcting control device. Consequently there does not occur the uncontrolled function of the vibration correcting control device or independent correction thereof on vibration, and there can be reduced the power consumption in the devices required in the correction of vibration, such as the driving device, and also be prevented the generation or expansion of troubles.

Also in the camera of the present invention, as the serial data communication is identified as abnormal in case, in the serial data transmission from the main control device to the vibration correcting control device, the main control device detects an absence of the response signal from the vibration correcting control device within the predetermined time, the main control device can more securely detect the abnormality in the serial data communication.

Also in the camera of the present invention, as the serial data communication is identified as abnormal in case, in the reception by the main control device of serial data from the vibration correcting control device, the main control device detects an absence of the response signal from said vibration correcting control device within the predetermined time, the main control device can more securely detect the abnormality in the serial data communication.

Also in the camera of the present invention, as the serial data communication is identified as abnormal in case, in the reception by the main control device of serial data from the vibration correcting control device, the main control device detects that thus received data are not normal, the main control device can more securely detect the abnormality in the serial data communication.

Also in the camera of the present invention, in case the vibration correcting control device is shifted to the stopped state by the abnormality in the serial data communication, said control device is released from the stopped state by the output signal from the main control device to the vibration correcting control device, utilizing at least one of the electrically connected signal lines. Consequently, even after the vibration correcting control device is once shifted to the stopped state, it can be rendered functionable again and capable of control.

Also in the camera of the present invention, in case the vibration correcting control device is shifted to the stopped state by the absence of serial data communication from the vibration correcting control device to the main control device within the predetermined time after the serial data communication from the main control device to the vibration correcting control device, said control device is released from the stopped state by the output signal thereto from the main control signal, utilizing at least one of the electrically connected signal lines. Consequently, even after the vibration correcting control device is once shifted to the stopped state, it can be rendered functionable again and capable of control.

Also in the camera of the present invention, after the vibration correcting control device is released from the stopped state, the main control device is adapted, by serial data communication thereof to the vibration correcting control device, to cause said control device to drive the optical axis varying device to the predetermined reference position. Consequently, the optical axis varying device can be driven to the predetermined reference position, even in case the optical axis is stopped at an intermediate position by the uncontrolled function or stoppage of the vibration correcting control device resulting from the abnormality in the serial data communication or from the absence of the serial data communication from the vibration correcting control device.

Also in the camera of the present invention, as the vibration correcting control device is adapted to cut off the power supply to the vibration detecting device and the driving device in case said control device detects abnormality in the serial data communication, there can be reduced the power consumption in the vibration detecting device and the driving device even in case of the abnormality in the serial data communication.

Also in the camera of the present invention, as the vibration correcting control device is shifted from the function state to the stand-by state in case said control device detects abnormality in the serial data communication, there can be reduced the power consumption in said control device even in case of the abnormality in the serial data communication.

Also in the camera of the present invention, as the serial data communication is identified as abnormal in case, in the reception by the vibration correcting control device of the serial data from the main control device, the vibration correcting control device detects the absence of the response signal from the main control device within the predetermined time, the vibration correcting control device can more securely detect the abnormality in the serial data communication.

Also in the camera of the present invention, as the serial data communication is identified as abnormal in case, in the serial data transmission from the vibration correcting control device to the main control device, the vibration correcting control device detects the absence of the response signal from the main control device within the predetermined time, the vibration correcting control device can more securely detect the abnormality in the serial data communication.

Also in the camera of the present invention, as the serial data communication is identified as abnormal in case, in the reception by the vibration correcting control device of the serial data from the main control device, the vibration correcting control device detects that the data transfer from the main control device is not completed within the predetermined time, the vibration correcting control device can more securely detect the abnormality in the serial data communication.

Also in the camera of the present invention, as the serial data communication is identified as abnormal in case, in the serial data transmission from the vibration correcting control device to the main control device, the vibration correcting control device detects that the data transfer to the main control device is not completed within the predetermined time, the vibration correcting control device can more securely detect the abnormality in the serial data communication.

Also in the camera of the present invention, as the serial data communication is identified as abnormal in case, in the reception by the main control device of the serial data from the vibration correcting control device, the vibration correcting control device detects that the received data are not normal, said control device can more securely detect the abnormality in the serial data communication.

What is claimed is:

1. A camera with a vibration correcting function, comprising:
    a vibration detecting device to detect a vibration of said camera;
    an optical axis varying device to vary an optical axis of a phototaking lens;
    a driving device to drive said optical axis varying device;
    a vibration correcting control device, having a stopped state without function and a function state, to control said driving device to drive said optical axis varying device to correct the vibration detected by said vibration detecting device; and
    a main control device, electrically connected with said vibration correcting control device, to control a phototaking exposure process of said camera, to control switching said vibration correcting control device from said stopped state to said function state with a control signal, and after switching said vibration correcting control device to said function state, to control said vibration correcting control device through data communication, wherein if an abnormality in the data communication between said main control device and said vibration correcting control device is detected, said vibration correcting control device is subjected to a predetermined process.

2. A camera according to claim 1, wherein said main control device detects the abnormality.

3. A camera according to claim 1, wherein said vibration control device detects the abnormality.

4. A camera according to claim 1, wherein the abnormality is detected if the data communication with said main control device is not made within a predetermined time.

5. A camera according to claim 1, wherein the abnormality is detected if the data communication with said main control device is not made until a predetermined time is lapsed from when said vibration correcting control device is switched from said stopped state.

6. A camera according to claim 1, wherein the data communication is a serial data communication.

7. A camera according to claim 1, wherein the abnormality is detected if said vibration correcting control device does not respond to the data communication from said main control device within in a predetermined time.

8. A camera according to claim 1, wherein the abnormality is detected if the data communication received is not normal.

9. A camera according to claim 1, wherein the abnormality is detected if said main control device does not output a signal in the data communication within a predetermined time.

10. A camera according to claim 1, wherein the abnormality is detected if the data communication with said main control device is not completed within a predetermined time.

11. A camera according to claim 1, wherein the abnormality is detected if the data communication from said main control device is not normal.

12. A camera according to claim 1, wherein the abnormality is detected if the data communication is not made within a predetermined time.

13. A camera according to claim 1, wherein the predetermined process is to cut off a power supply to said vibration detection device and said driving device.

14. A camera according to claim 1, wherein said vibration correcting control device further includes a stand-by state, and the predetermined process switches said vibration correcting control device to said stand-by state.

15. A camera according to claim 1, wherein said vibration correcting control device further includes a stand-by state, and in the predetermined process, said main control device switches said vibration correcting control device to said stand-by state.

16. A camera according to claim 1, wherein said vibration correcting control device further includes a stand-by state, and the predetermined process switches said vibration correcting control device from said function state to said stand-by state.

17. A camera according to claim 1, wherein said vibration correcting control device further includes a stand-by state, and in the predetermined process, said main control device switches said vibration correcting control device from said function state to said stand-by state.

18. A camera according to claim 1, wherein the predetermined process switches said vibration correcting control device from said function state to said stopped state.

19. A camera according to claim 1, wherein in the predetermined process, said main control device switches said vibration correcting control device from said function state to said stopped state.

20. A camera according to claim 1, wherein in the predetermined process, said main control device switches said vibration correcting control device to said stopped state.

21. A camera according to claim 1, wherein the predetermined process switches said vibration correcting control device to said stopped state.

22. A camera according to claim 1,
    wherein said vibration correcting control device further includes a stand-by state, and wherein the abnormality is detected if the data communication with said main control device is not made until a predetermined time is lapsed from when said vibration control device is switched from said stand-by state.

23. A camera with a vibration correcting function, comprising:

a vibration detecting device to detect a vibration of said camera;

an optical axis varying device to vary an optical axis of a phototaking lens;

a driving device to drive said optical axis varying device;

a vibration correcting control device, having a stopped state without function and a function state, to control said driving device to drive said optical axis varying device to correct the vibration based on the vibration detected by said vibration detecting device; and a main control device, electrically connected with said vibration correcting control device, to control a phototaking exposure process of said camera, to control switching said vibration correcting control device from said stopped state to said function state with a control signal, and after switching said vibration correcting control device to said function state, to control said vibration correcting control device through data communication, wherein said vibration correcting control device is subjected to a predetermined process if a predetermined phototaking process of said camera is interrupted.

24. A camera according to claim 23, further comprising a half-stroke switch operation member, wherein the interruption of the predetermined phototaking process cancels an activation of said half-stroke switch operation member.

25. A camera according to claim 23, further comprising a self-timer, wherein the interruption of the predetermined phototaking process stops a self-timer phototaking process during counting in said self-timer.

26. A camera according to claim 23, wherein the predetermined process cuts off a power supply to said vibration detection device and said driving device.

27. A camera according to claim 23, wherein said vibration correcting control device further includes a stand-by state, and the predetermined process switches said vibration correcting control device to said stand-by state.

28. A camera according to claim 23, wherein said vibration correcting control device further includes a stand-by state, and in the predetermined process, said main control device switches said vibration correcting control device to said stand-by state.

29. A camera according to claim 23, wherein said vibration correcting control device further includes a stand-by state, and the predetermined process switches said vibration correcting control device from said function state to said stand-by state.

30. A camera according to claim 23, wherein said vibration correcting control device further includes a stand-by state, and in the predetermined process, said main control device switches said vibration correcting control device from said function state to said stand-by state.

31. A camera according to claim 23, wherein the predetermined process switches said vibration correcting control device from said function state to said stopped state.

32. A camera according to claim 23, wherein in the predetermined process, said main control device switches said vibration correcting control device from said function state to said stopped state.

33. A camera according to claim 23, wherein in the predetermined process, said main control device switches said vibration correcting control device to said stopped state.

34. A camera according to claim 23, wherein the predetermined process switches said vibration correcting control device to said stopped state.

35. A camera with a vibration correcting function, comprising:

an electronic flash device;

a vibration detecting device to detect a vibration of said camera;

an optical axis varying device to vary an optical axis of a phototaking lens;

a driving device to drive said optical axis varying device;

a vibration correcting control device, having a stopped state without function and a function state, to control said driving device to drive said optical axis varying device to correct the vibration detected by said vibration detecting device; and a main control device, electrically connected with said vibration correcting control device, to control a phototaking exposure process of said camera, to control switching said vibration correcting control device from said stopped state to said function state with a control signal, and after switching said vibration correcting control device to said function state, to control said vibration correcting control device through data communication, wherein if said electronic flash device is not charged, said vibration correcting control device is subjected to a predetermined process.

36. A camera according to claim 35, wherein the predetermined process cuts off a power supply to said vibration detection device and said driving device.

37. A camera according to claim 35, wherein said vibration correcting control device further includes a stand-by state, and the predetermined process switches said vibration correcting control device to said stand-by state.

38. A camera according to claim 35, wherein said vibration correcting control device further includes a stand-by state, and in the predetermined process, said main control device switches said vibration correcting control device to said stand-by state.

39. A camera according to claim 35, wherein said vibration correcting control device further includes a stand-by state, and the predetermined process switches said vibration correcting control device from said function state to said stand-by state.

40. A camera according to claim 35, wherein said vibration correcting control device further includes a stand-by state, and in the predetermined process, said main control device switches said vibration correcting control device from said function state to said stand-by state.

41. A camera according to claim 35, wherein the predetermined process switches said vibration correcting control device from said function state to said stopped state.

42. A camera according to claim 35, wherein in the predetermined process, said main control device switches said vibration correcting control device from said function state to said stopped state.

43. A camera according to claim 35, wherein in the predetermined process, said main control device switches said vibration correcting control device to said stopped state.

44. A camera according to claim 35, wherein the predetermined process switches said vibration correcting control device to said stopped state.

* * * * *